United States Patent
Gordon et al.

(10) Patent No.: US 9,355,681 B2
(45) Date of Patent: May 31, 2016

(54) MPEG OBJECTS AND SYSTEMS AND METHODS FOR USING MPEG OBJECTS

(75) Inventors: Donald Gordon, Mountain View, CA (US); Lena Y. Pavlovskaia, Cupertino, CA (US); Airan Landau, San Jose, CA (US); Andreas Lennartsson, Manchester, MD (US); Glenn M. Cloud, Parkton, MD (US)

(73) Assignee: ACTIVEVIDEO NETWORKS, INC., San Jose, CA (US)

(*) Notice: Subject to any disclaimer, the term of this patent is extended or adjusted under 35 U.S.C. 154(b) by 1001 days.

(21) Appl. No.: 12/008,722

(22) Filed: Jan. 11, 2008

(65) Prior Publication Data

US 2008/0178249 A1 Jul. 24, 2008

Related U.S. Application Data

(60) Provisional application No. 60/884,773, filed on Jan. 12, 2007, provisional application No. 60/884,744, filed on Jan. 12, 2007, provisional application No. 60/884,772, filed on Jan. 12, 2007.

(51) Int. Cl.
*G11B 27/031* (2006.01)
*G06F 3/16* (2006.01)
(Continued)

(52) U.S. Cl.
CPC .............. *G11B 27/031* (2013.01); *H04N 19/23* (2014.11); *H04N 19/48* (2014.11); *H04N 19/527* (2014.11);
(Continued)

(58) Field of Classification Search
CPC ............ G06F 3/00; G06F 3/16; G11B 27/031
USPC .................................................. 715/723, 716
See application file for complete search history.

(56) References Cited

U.S. PATENT DOCUMENTS

| 3,889,050 A | 6/1975 | Thompson |
| 3,934,079 A | 1/1976 | Barnhart |

(Continued)

FOREIGN PATENT DOCUMENTS

| AT | 191599 T | 4/2000 |
| AT | 198969 T | 2/2001 |

(Continued)

OTHER PUBLICATIONS

Authorized Officer Jürgen Güttlich, International Search Report and Written Opinion, dated Jan. 12, 2007, PCT/US2008/000400.
(Continued)

*Primary Examiner* — Steven Sax
*Assistant Examiner* — Le Nguyen
(74) *Attorney, Agent, or Firm* — Morgan, Lewis & Bockius LLP

(57) ABSTRACT

An MPEG object is an object-oriented data structure that may be used in the creation of interactive MPEG video stream. The MPEG object data structure includes an MPEG object interface defining data received by the MPEG object and data output by the MPEG object. The MPEG object data structure further includes either one or more MPEG video elements or an association to one or more MPEG video elements. The MPEG video elements are preferably defined as MPEG slices that include a plurality of encoded macroblocks. Additionally, the data structure may provide a method for receiving input through the MPEG object interface and in response to input from the client device outputting an MPEG video element. In certain configurations, the MPEG object contains a method that maintains state data for the MPEG object. The state data may be used to select between a plurality of MPEG elements to output. In other configurations, the MPEG object includes a method that provides for the control of streaming MPEG content from a source external to the MPEG object.

5 Claims, 10 Drawing Sheets

(51) Int. Cl.

| | |
|---|---|
| *H04N 21/234* | (2011.01) |
| *H04N 21/2343* | (2011.01) |
| *H04N 21/2365* | (2011.01) |
| *H04N 21/431* | (2011.01) |
| *H04N 21/434* | (2011.01) |
| *H04N 21/44* | (2011.01) |
| *H04N 21/4722* | (2011.01) |
| *H04N 21/81* | (2011.01) |
| *H04N 21/8543* | (2011.01) |
| *H04N 21/2368* | (2011.01) |
| *H04N 19/48* | (2014.01) |
| *H04N 19/23* | (2014.01) |
| *H04N 19/527* | (2014.01) |

(52) U.S. Cl.
CPC ....... *H04N 21/2343* (2013.01); *H04N 21/2365* (2013.01); *H04N 21/2368* (2013.01); *H04N 21/23412* (2013.01); *H04N 21/23424* (2013.01); *H04N 21/4316* (2013.01); *H04N 21/4347* (2013.01); *H04N 21/44012* (2013.01); *H04N 21/4722* (2013.01); *H04N 21/812* (2013.01); *H04N 21/8543* (2013.01); *G06F 3/16* (2013.01)

(56) References Cited

U.S. PATENT DOCUMENTS

| | | |
|---|---|---|
| 3,997,718 A | 12/1976 | Ricketts et al. |
| 4,002,843 A | 1/1977 | Rackman |
| 4,032,972 A | 6/1977 | Saylor |
| 4,077,006 A | 2/1978 | Nicholson |
| 4,081,831 A | 3/1978 | Tang et al. |
| 4,107,734 A | 8/1978 | Percy et al. |
| 4,107,735 A | 8/1978 | Frohbach |
| 4,145,720 A | 3/1979 | Weintraub et al. |
| 4,168,400 A | 9/1979 | de Couasnon et al. |
| 4,186,438 A | 1/1980 | Benson et al. |
| 4,222,068 A | 9/1980 | Thompson |
| 4,245,245 A | 1/1981 | Matsumoto et al. |
| 4,247,106 A | 1/1981 | Jeffers et al. |
| 4,253,114 A | 2/1981 | Tang et al. |
| 4,264,924 A | 4/1981 | Freeman |
| 4,264,925 A | 4/1981 | Freeman et al. |
| 4,290,142 A | 9/1981 | Schnee et al. |
| 4,302,771 A | 11/1981 | Gargini |
| 4,308,554 A | 12/1981 | Percy et al. |
| 4,350,980 A | 9/1982 | Ward |
| 4,367,557 A | 1/1983 | Stern et al. |
| 4,395,780 A | 7/1983 | Gohm et al. |
| 4,408,225 A | 10/1983 | Ensinger et al. |
| 4,450,477 A | 5/1984 | Lovett |
| 4,454,538 A | 6/1984 | Toriumi |
| 4,466,017 A | 8/1984 | Banker |
| 4,471,380 A | 9/1984 | Mobley |
| 4,475,123 A | 10/1984 | Dumbauld et al. |
| 4,484,217 A | 11/1984 | Block et al. |
| 4,491,983 A | 1/1985 | Pinnow et al. |
| 4,506,387 A | 3/1985 | Walter |
| 4,507,680 A | 3/1985 | Freeman |
| 4,509,073 A | 4/1985 | Baran et al. |
| 4,523,228 A | 6/1985 | Banker |
| 4,533,948 A | 8/1985 | McNamara et al. |
| 4,536,791 A | 8/1985 | Campbell et al. |
| 4,538,174 A | 8/1985 | Gargini et al. |
| 4,538,176 A | 8/1985 | Nakajima et al. |
| 4,553,161 A | 11/1985 | Citta |
| 4,554,581 A | 11/1985 | Tentler et al. |
| 4,555,561 A | 11/1985 | Sugimori et al. |
| 4,562,465 A | 12/1985 | Glaab |
| 4,567,517 A | 1/1986 | Mobley |
| 4,573,072 A | 2/1986 | Freeman |
| 4,591,906 A | 5/1986 | Morales-Garza et al. |
| 4,602,279 A | 7/1986 | Freeman |
| 4,614,970 A | 9/1986 | Clupper et al. |
| 4,616,263 A | 10/1986 | Eichelberger |
| 4,625,235 A | 11/1986 | Watson |
| 4,627,105 A | 12/1986 | Ohashi et al. |
| 4,633,462 A | 12/1986 | Stifle et al. |
| 4,670,904 A | 6/1987 | Rumreich |
| 4,682,360 A | 7/1987 | Frederiksen |
| 4,695,880 A | 9/1987 | Johnson et al. |
| 4,706,121 A | 11/1987 | Young |
| 4,706,285 A | 11/1987 | Rumreich |
| 4,709,418 A | 11/1987 | Fox et al. |
| 4,710,971 A | 12/1987 | Nozaki et al. |
| 4,718,086 A | 1/1988 | Rumreich et al. |
| 4,732,764 A | 3/1988 | Hemingway et al. |
| 4,734,764 A | 3/1988 | Pocock et al. |
| 4,748,689 A | 5/1988 | Mohr |
| 4,749,992 A | 6/1988 | Fitzemeyer et al. |
| 4,750,036 A | 6/1988 | Martinez |
| 4,754,426 A | 6/1988 | Rast et al. |
| 4,760,442 A | 7/1988 | O'Connell et al. |
| 4,763,317 A | 8/1988 | Lehman et al. |
| 4,769,833 A | 9/1988 | Farleigh et al. |
| 4,769,838 A | 9/1988 | Hasegawa |
| 4,789,863 A | 12/1988 | Bush |
| 4,792,849 A | 12/1988 | McCalley et al. |
| 4,801,190 A | 1/1989 | Imoto |
| 4,805,134 A | 2/1989 | Calo et al. |
| 4,807,031 A | 2/1989 | Broughton et al. |
| 4,816,905 A | 3/1989 | Tweedy et al. |
| 4,821,102 A | 4/1989 | Ichikawa et al. |
| 4,823,386 A | 4/1989 | Dumbauld et al. |
| 4,827,253 A | 5/1989 | Maltz |
| 4,827,511 A | 5/1989 | Masuko |
| 4,829,372 A | 5/1989 | McCalley et al. |
| 4,829,558 A | 5/1989 | Welsh |
| 4,847,698 A | 7/1989 | Freeman |
| 4,847,699 A | 7/1989 | Freeman |
| 4,847,700 A | 7/1989 | Freeman |
| 4,848,698 A | 7/1989 | Newell et al. |
| 4,860,379 A | 8/1989 | Schoeneberger et al. |
| 4,864,613 A | 9/1989 | Van Cleave |
| 4,876,592 A | 10/1989 | Von Kohorn |
| 4,889,369 A | 12/1989 | Albrecht |
| 4,890,320 A | 12/1989 | Monslow et al. |
| 4,891,694 A | 1/1990 | Way |
| 4,901,367 A | 2/1990 | Nicholson |
| 4,903,126 A | 2/1990 | Kassatly |
| 4,905,094 A | 2/1990 | Pocock et al. |
| 4,912,760 A | 3/1990 | West, Jr. et al. |
| 4,918,516 A | 4/1990 | Freeman |
| 4,920,566 A | 4/1990 | Robbins et al. |
| 4,922,532 A | 5/1990 | Farmer et al. |
| 4,924,303 A | 5/1990 | Brandon et al. |
| 4,924,498 A | 5/1990 | Farmer et al. |
| 4,937,821 A | 6/1990 | Boulton |
| 4,941,040 A | 7/1990 | Pocock et al. |
| 4,947,244 A | 8/1990 | Fenwick et al. |
| 4,961,211 A | 10/1990 | Tsugane et al. |
| 4,963,995 A | 10/1990 | Lang |
| 4,975,771 A | 12/1990 | Kassatly |
| 4,989,245 A | 1/1991 | Bennett |
| 4,994,909 A | 2/1991 | Graves et al. |
| 4,995,078 A | 2/1991 | Monslow et al. |
| 5,003,384 A | 3/1991 | Durden et al. |
| 5,008,934 A | 4/1991 | Endoh |
| 5,014,125 A | 5/1991 | Pocock et al. |
| 5,027,400 A | 6/1991 | Baji et al. |
| 5,051,720 A | 9/1991 | Kittirutsunetorn |
| 5,051,822 A | 9/1991 | Rhoades |
| 5,057,917 A | 10/1991 | Shalkauser et al. |
| 5,058,160 A | 10/1991 | Banker et al. |
| 5,060,262 A | 10/1991 | Bevins, Jr et al. |
| 5,077,607 A | 12/1991 | Johnson et al. |
| 5,083,800 A | 1/1992 | Lockton |
| 5,088,111 A | 2/1992 | McNamara et al. |
| 5,093,718 A | 3/1992 | Hoarty et al. .................. 358/84 |
| 5,109,414 A | 4/1992 | Harvey et al. |
| 5,113,496 A | 5/1992 | McCalley et al. |
| 5,119,188 A | 6/1992 | McCalley et al. |

(56) References Cited

U.S. PATENT DOCUMENTS

| | | | |
|---|---|---|---|
| 5,130,792 A | 7/1992 | Tindell et al. | |
| 5,132,992 A | 7/1992 | Yurt et al. | |
| 5,133,009 A | 7/1992 | Rumreich | |
| 5,133,079 A | 7/1992 | Ballantyne et al. | |
| 5,136,411 A | 8/1992 | Paik et al. | |
| 5,142,575 A | 8/1992 | Farmer et al. | |
| 5,144,448 A * | 9/1992 | Hornbaker et al. | 348/324 |
| 5,155,591 A | 10/1992 | Wachob | |
| 5,172,413 A | 12/1992 | Bradley et al. | |
| 5,191,410 A | 3/1993 | McCalley et al. | |
| 5,195,092 A | 3/1993 | Wilson et al. | |
| 5,208,665 A | 5/1993 | McCalley et al. | |
| 5,220,420 A | 6/1993 | Hoarty et al. | 358/86 |
| 5,230,019 A | 7/1993 | Yanagimichi et al. | |
| 5,231,494 A | 7/1993 | Wachob | |
| 5,236,199 A | 8/1993 | Thompson, Jr. | |
| 5,247,347 A | 9/1993 | Litteral et al. | |
| 5,253,341 A | 10/1993 | Rozmanith et al. | |
| 5,262,854 A | 11/1993 | Ng | |
| 5,262,860 A | 11/1993 | Fitzpatrick et al. | |
| 5,303,388 A | 4/1994 | Kreitman et al. | |
| 5,319,455 A | 6/1994 | Hoarty et al. | 348/7 |
| 5,319,707 A | 6/1994 | Wasilewski et al. | |
| 5,321,440 A | 6/1994 | Yanagihara et al. | |
| 5,321,514 A | 6/1994 | Martinez | |
| 5,351,129 A | 9/1994 | Lai | |
| 5,355,162 A | 10/1994 | Yazolino et al. | |
| 5,359,601 A | 10/1994 | Wasilewski et al. | |
| 5,361,091 A | 11/1994 | Hoarty et al. | 348/7 |
| 5,371,532 A | 12/1994 | Gelman et al. | |
| 5,404,393 A | 4/1995 | Remillard | |
| 5,408,274 A | 4/1995 | Chang et al. | |
| 5,410,343 A | 4/1995 | Coddington et al. | |
| 5,410,344 A | 4/1995 | Graves et al. | |
| 5,412,415 A | 5/1995 | Cook et al. | |
| 5,412,720 A | 5/1995 | Hoarty | 380/15 |
| 5,418,559 A | 5/1995 | Blahut | |
| 5,422,674 A | 6/1995 | Hooper et al. | |
| 5,422,887 A | 6/1995 | Diepstraten et al. | |
| 5,442,389 A | 8/1995 | Blahut et al. | |
| 5,442,390 A | 8/1995 | Hooper et al. | |
| 5,442,700 A | 8/1995 | Snell et al. | |
| 5,446,490 A | 8/1995 | Blahut et al. | |
| 5,469,283 A | 11/1995 | Vinel et al. | |
| 5,469,431 A | 11/1995 | Wendorf et al. | |
| 5,471,263 A | 11/1995 | Odaka | |
| 5,481,542 A | 1/1996 | Logston et al. | |
| 5,485,197 A | 1/1996 | Hoarty | 348/7 |
| 5,487,066 A | 1/1996 | McNamara et al. | |
| 5,493,638 A | 2/1996 | Hooper et al. | 395/135 |
| 5,495,283 A | 2/1996 | Cowe | |
| 5,495,295 A | 2/1996 | Long | |
| 5,497,187 A | 3/1996 | Banker et al. | |
| 5,517,250 A | 5/1996 | Hoogenboom et al. | |
| 5,526,034 A | 6/1996 | Hoarty et al. | 348/7 |
| 5,528,281 A | 6/1996 | Grady et al. | |
| 5,537,397 A | 7/1996 | Abramson | |
| 5,537,404 A | 7/1996 | Bentley et al. | |
| 5,539,449 A | 7/1996 | Blahut et al. | |
| RE35,314 E | 8/1996 | Logg | |
| 5,548,340 A | 8/1996 | Bertram | |
| 5,550,578 A | 8/1996 | Hoarty et al. | 348/7 |
| 5,557,316 A | 9/1996 | Hoarty et al. | |
| 5,559,549 A | 9/1996 | Hendricks et al. | |
| 5,561,708 A | 10/1996 | Remillard | |
| 5,570,126 A | 10/1996 | Blahut et al. | |
| 5,570,363 A | 10/1996 | Holm | |
| 5,579,143 A | 11/1996 | Huber | |
| 5,581,653 A | 12/1996 | Todd | |
| 5,583,927 A | 12/1996 | Ely et al. | |
| 5,587,734 A | 12/1996 | Lauder et al. | |
| 5,589,885 A | 12/1996 | Ooi | |
| 5,592,470 A | 1/1997 | Rudrapatna et al. | |
| 5,594,507 A | 1/1997 | Hoarty | 348/584 |
| 5,594,723 A | 1/1997 | Tibi | |
| 5,594,938 A | 1/1997 | Engel | |
| 5,596,693 A | 1/1997 | Needle et al. | |
| 5,600,364 A | 2/1997 | Hendricks et al. | |
| 5,600,573 A | 2/1997 | Hendricks et al. | |
| 5,608,446 A | 3/1997 | Carr et al. | |
| 5,617,145 A | 4/1997 | Huang et al. | |
| 5,621,464 A | 4/1997 | Teo et al. | |
| 5,625,404 A | 4/1997 | Grady et al. | |
| 5,630,757 A | 5/1997 | Gagin et al. | |
| 5,631,693 A | 5/1997 | Wunderlich et al. | |
| 5,631,846 A | 5/1997 | Szurkowski | |
| 5,632,003 A | 5/1997 | Davidson et al. | |
| 5,649,283 A | 7/1997 | Galler et al. | |
| 5,668,592 A | 9/1997 | Spaulding, II | |
| 5,668,599 A | 9/1997 | Cheney et al. | |
| 5,708,767 A | 1/1998 | Yeo et al. | |
| 5,710,815 A | 1/1998 | Ming et al. | |
| 5,712,906 A | 1/1998 | Grady et al. | |
| 5,740,307 A | 4/1998 | Lane | |
| 5,742,289 A | 4/1998 | Naylor et al. | |
| 5,748,234 A | 5/1998 | Lippincott | |
| 5,754,941 A | 5/1998 | Sharpe et al. | |
| 5,786,527 A | 7/1998 | Tarte | |
| 5,790,174 A | 8/1998 | Richard, III et al. | |
| 5,802,283 A | 9/1998 | Grady et al. | |
| 5,812,665 A | 9/1998 | Hoarty et al. | 380/10 |
| 5,812,786 A | 9/1998 | Seazholtz et al. | |
| 5,815,604 A * | 9/1998 | Simons et al. | 382/250 |
| 5,818,438 A | 10/1998 | Howe et al. | |
| 5,821,945 A | 10/1998 | Yeo et al. | |
| 5,822,537 A | 10/1998 | Katseff et al. | |
| 5,828,371 A | 10/1998 | Cline et al. | |
| 5,844,594 A | 12/1998 | Ferguson | |
| 5,845,083 A | 12/1998 | Hamadani et al. | |
| 5,862,325 A | 1/1999 | Reed et al. | |
| 5,864,820 A | 1/1999 | Case | |
| 5,867,208 A | 2/1999 | McLaren | |
| 5,883,661 A | 3/1999 | Hoarty | 348/7 |
| 5,903,727 A | 5/1999 | Nielsen | |
| 5,903,816 A | 5/1999 | Broadwin et al. | |
| 5,905,522 A | 5/1999 | Lawler | |
| 5,907,681 A | 5/1999 | Bates et al. | |
| 5,917,822 A | 6/1999 | Lyles et al. | |
| 5,946,352 A | 8/1999 | Rowlands et al. | |
| 5,952,943 A | 9/1999 | Walsh et al. | |
| 5,959,690 A * | 9/1999 | Toebes et al. | 348/578 |
| 5,961,603 A | 10/1999 | Kunkel et al. | |
| 5,963,203 A | 10/1999 | Goldberg et al. | |
| 5,966,163 A | 10/1999 | Lin et al. | |
| 5,978,756 A | 11/1999 | Walker et al. | |
| 5,982,445 A | 11/1999 | Eyer et al. | |
| 5,990,862 A | 11/1999 | Lewis | |
| 5,995,146 A | 11/1999 | Rasmussen | |
| 5,995,488 A | 11/1999 | Kalkunte et al. | |
| 5,999,970 A | 12/1999 | Krisbergh et al. | |
| 6,014,416 A | 1/2000 | Shin et al. | |
| 6,021,386 A | 2/2000 | Davis et al. | |
| 6,031,989 A | 2/2000 | Cordell | |
| 6,034,678 A | 3/2000 | Hoarty et al. | 345/327 |
| 6,049,539 A | 4/2000 | Lee et al. | |
| 6,049,831 A | 4/2000 | Gardell et al. | |
| 6,052,555 A | 4/2000 | Ferguson | |
| 6,055,314 A | 4/2000 | Spies et al. | |
| 6,055,315 A | 4/2000 | Doyle et al. | |
| 6,064,377 A | 5/2000 | Hoarty et al. | 345/327 |
| 6,078,328 A * | 6/2000 | Schumann et al. | 345/418 |
| 6,084,908 A | 7/2000 | Chiang et al. | |
| 6,100,883 A | 8/2000 | Hoarty | 345/327 |
| 6,108,625 A | 8/2000 | Kim | |
| 6,131,182 A * | 10/2000 | Beakes et al. | 716/105 |
| 6,141,645 A | 10/2000 | Chi-Min et al. | |
| 6,141,693 A | 10/2000 | Perlman et al. | |
| 6,144,698 A | 11/2000 | Poon et al. | |
| 6,167,084 A | 12/2000 | Wang et al. | |
| 6,169,573 B1 * | 1/2001 | Sampath-Kumar et al. | 348/169 |
| 6,177,931 B1 | 1/2001 | Alexander et al. | |
| 6,182,072 B1 | 1/2001 | Leak et al. | |
| 6,184,878 B1 | 2/2001 | Alonso et al. | |
| 6,192,081 B1 | 2/2001 | Chiang et al. | |

(56) References Cited

U.S. PATENT DOCUMENTS

| | | |
|---|---|---|
| 6,198,822 B1 | 3/2001 | Doyle et al. |
| 6,205,582 B1 | 3/2001 | Hoarty ............................ 725/93 |
| 6,226,041 B1 | 5/2001 | Florencio et al. |
| 6,236,730 B1 | 5/2001 | Cowieson et al. |
| 6,243,418 B1 | 6/2001 | Kim |
| 6,253,238 B1 | 6/2001 | Lauder et al. |
| 6,253,375 B1 | 6/2001 | Gordon et al. .................... 725/88 |
| 6,256,047 B1 | 7/2001 | Isobe et al. |
| 6,259,826 B1 * | 7/2001 | Pollard et al. .................. 382/284 |
| 6,266,369 B1 | 7/2001 | Wang et al. |
| 6,266,684 B1 * | 7/2001 | Kraus et al. .................... 715/209 |
| 6,275,496 B1 | 8/2001 | Burns et al. |
| 6,292,194 B1 | 9/2001 | Powell, III |
| 6,305,020 B1 | 10/2001 | Hoarty et al. ..................... 725/95 |
| 6,317,151 B1 | 11/2001 | Ohsuga et al. |
| 6,317,885 B1 | 11/2001 | Fries |
| 6,324,217 B1 | 11/2001 | Gordon ..................... 375/240.28 |
| 6,349,284 B1 | 2/2002 | Park et al. |
| 6,385,771 B1 | 5/2002 | Gordon |
| 6,386,980 B1 | 5/2002 | Nishino et al. |
| 6,389,075 B2 | 5/2002 | Wang et al. |
| 6,389,218 B2 | 5/2002 | Gordon et al. |
| 6,415,031 B1 | 7/2002 | Colligan et al. |
| 6,415,437 B1 | 7/2002 | Ludvig et al. |
| 6,438,140 B1 | 8/2002 | Jungers et al. |
| 6,446,037 B1 | 9/2002 | Fielder et al. |
| 6,459,427 B1 | 10/2002 | Mao et al. |
| 6,477,182 B2 | 11/2002 | Calderone |
| 6,480,210 B1 | 11/2002 | Martino et al. |
| 6,481,012 B1 | 11/2002 | Gordon et al. .................... 725/54 |
| 6,512,793 B1 | 1/2003 | Maeda |
| 6,525,746 B1 * | 2/2003 | Lau et al. ........................ 715/725 |
| 6,536,043 B1 | 3/2003 | Guedalia |
| 6,557,041 B2 | 4/2003 | Mallart |
| 6,560,496 B1 | 5/2003 | Michener |
| 6,564,378 B1 | 5/2003 | Satterfield et al. |
| 6,578,201 B1 | 6/2003 | LaRocca et al. |
| 6,579,184 B1 | 6/2003 | Tanskanen |
| 6,584,153 B1 | 6/2003 | Gordon et al. ............ 375/240.13 |
| 6,588,017 B1 | 7/2003 | Calderone |
| 6,598,229 B2 | 7/2003 | Smyth et al. |
| 6,604,224 B1 | 8/2003 | Armstrong et al. |
| 6,614,442 B1 | 9/2003 | Ouyang et al. |
| 6,614,843 B1 | 9/2003 | Gordon et al. ............ 375/240.01 |
| 6,621,870 B1 | 9/2003 | Gordon et al. ............ 375/240.28 |
| 6,625,574 B1 | 9/2003 | Taniguchi et al. |
| 6,639,896 B1 | 10/2003 | Goode et al. |
| 6,645,076 B1 | 11/2003 | Sugai |
| 6,651,252 B1 | 11/2003 | Gordon et al. .................... 725/54 |
| 6,657,647 B1 | 12/2003 | Bright |
| 6,675,385 B1 | 1/2004 | Wang |
| 6,675,387 B1 | 1/2004 | Boucher et al. |
| 6,681,326 B2 | 1/2004 | Son et al. |
| 6,681,397 B1 | 1/2004 | Tsai et al. |
| 6,684,400 B1 | 1/2004 | Goode et al. |
| 6,687,663 B1 | 2/2004 | McGrath et al. |
| 6,691,208 B2 | 2/2004 | Dandrea et al. |
| 6,697,376 B1 | 2/2004 | Son et al. |
| 6,704,359 B1 | 3/2004 | Bayrakeri et al. |
| 6,717,600 B2 | 4/2004 | Dutta et al. |
| 6,718,552 B1 | 4/2004 | Goode |
| 6,721,794 B2 | 4/2004 | Taylor et al. |
| 6,721,956 B2 | 4/2004 | Wasilewski |
| 6,727,929 B1 | 4/2004 | Bates et al. |
| 6,731,605 B1 | 5/2004 | Deshpande |
| 6,732,370 B1 | 5/2004 | Gordon et al. .................... 725/39 |
| 6,747,991 B1 | 6/2004 | Hemy et al. |
| 6,754,271 B1 | 6/2004 | Gordon et al. ............ 375/240.12 |
| 6,754,905 B2 | 6/2004 | Gordon et al. .................... 725/38 |
| 6,758,540 B1 | 7/2004 | Adolph et al. |
| 6,766,407 B1 | 7/2004 | Lisitsa et al. |
| 6,771,704 B1 | 8/2004 | Hannah |
| 6,785,902 B1 | 8/2004 | Zigmond et al. |
| 6,807,528 B1 | 10/2004 | Truman et al. |
| 6,810,528 B1 | 10/2004 | Chatani |
| 6,813,690 B1 | 11/2004 | Lango et al. |
| 6,817,947 B2 | 11/2004 | Tanskanen |
| 6,886,178 B1 | 4/2005 | Mao et al. |
| 6,907,574 B2 | 6/2005 | Xu et al. |
| 6,931,291 B1 | 8/2005 | Alvarez-Tinoco et al. |
| 6,934,965 B2 | 8/2005 | Gordon et al. .................... 725/54 |
| 6,941,019 B1 | 9/2005 | Mitchell et al. |
| 6,941,574 B1 | 9/2005 | Broadwin et al. |
| 6,947,509 B1 | 9/2005 | Wong |
| 6,952,221 B1 | 10/2005 | Holtz et al. |
| 6,956,899 B2 | 10/2005 | Hall et al. |
| 7,016,540 B1 | 3/2006 | Gong et al. |
| 7,030,890 B1 * | 4/2006 | Jouet et al. ..................... 345/619 |
| 7,031,385 B1 | 4/2006 | Inoue et al. |
| 7,050,113 B2 | 5/2006 | Campisano et al. |
| 7,089,577 B1 | 8/2006 | Rakib et al. |
| 7,093,028 B1 | 8/2006 | Shao et al. |
| 7,095,402 B2 | 8/2006 | Kunii et al. |
| 7,114,167 B2 | 9/2006 | Slemmer et al. |
| 7,124,424 B2 | 10/2006 | Gordon et al. .................... 725/43 |
| 7,146,615 B1 * | 12/2006 | Hervet et al. .................. 719/318 |
| 7,146,628 B1 | 12/2006 | Gordon et al. .................... 725/54 |
| 7,151,782 B1 | 12/2006 | Oz et al. |
| 7,158,676 B1 | 1/2007 | Rainsford |
| 7,200,836 B2 * | 4/2007 | Brodersen et al. ............ 717/100 |
| 7,212,573 B2 | 5/2007 | Winger |
| 7,224,731 B2 | 5/2007 | Mehrotra |
| 7,272,556 B1 | 9/2007 | Aguilar et al. |
| 7,310,619 B2 | 12/2007 | Baar et al. |
| 7,325,043 B1 | 1/2008 | Rosenberg et al. |
| 7,346,111 B2 | 3/2008 | Winger et al. |
| 7,360,230 B1 | 4/2008 | Paz et al. |
| 7,412,423 B1 | 8/2008 | Asano |
| 7,412,505 B2 | 8/2008 | Slemmer et al. |
| 7,421,082 B2 | 9/2008 | Kamiya et al. |
| 7,444,306 B2 | 10/2008 | Varble |
| 7,444,418 B2 | 10/2008 | Chou et al. |
| 7,500,235 B2 | 3/2009 | Maynard et al. |
| 7,508,941 B1 | 3/2009 | O'Toole, Jr. et al. |
| 7,512,577 B2 | 3/2009 | Slemmer et al. |
| 7,543,073 B2 | 6/2009 | Chou et al. |
| 7,596,764 B2 | 9/2009 | Vienneau et al. |
| 7,623,575 B2 | 11/2009 | Winger |
| 7,669,220 B2 | 2/2010 | Goode |
| 7,742,609 B2 | 6/2010 | Yeakel et al. |
| 7,743,400 B2 | 6/2010 | Kurauchi |
| 7,751,572 B2 | 7/2010 | Villemoes et al. |
| 7,757,157 B1 * | 7/2010 | Fukuda ........................ 715/202 |
| 7,830,388 B1 | 11/2010 | Lu |
| 7,840,905 B1 * | 11/2010 | Weber et al. .................. 715/765 |
| 7,936,819 B2 | 5/2011 | Craig et al. |
| 7,941,645 B1 * | 5/2011 | Riach et al. .................... 712/220 |
| 7,970,263 B1 * | 6/2011 | Asch ............................. 386/350 |
| 7,987,489 B2 | 7/2011 | Krzyzanowski et al. |
| 8,027,353 B2 | 9/2011 | Damola et al. |
| 8,036,271 B2 | 10/2011 | Winger et al. |
| 8,046,798 B1 | 10/2011 | Schlack et al. |
| 8,074,248 B2 | 12/2011 | Sigmon et al. |
| 8,118,676 B2 | 2/2012 | Craig et al. |
| 8,136,033 B1 | 3/2012 | Bhargava et al. |
| 8,149,917 B2 | 4/2012 | Zhang et al. |
| 8,155,194 B2 | 4/2012 | Winger et al. |
| 8,155,202 B2 | 4/2012 | Landau |
| 8,170,107 B2 | 5/2012 | Winger |
| 8,194,862 B2 | 6/2012 | Herr et al. |
| 8,243,630 B2 | 8/2012 | Luo et al. |
| 8,270,439 B2 | 9/2012 | Herr et al. |
| 8,284,842 B2 | 10/2012 | Craig et al. |
| 8,296,424 B2 | 10/2012 | Malloy et al. |
| 8,370,869 B2 | 2/2013 | Paek et al. |
| 8,411,754 B2 | 4/2013 | Zhang et al. |
| 8,442,110 B2 | 5/2013 | Pavlovskaia et al. |
| 8,473,996 B2 | 6/2013 | Gordon et al. |
| 8,619,867 B2 | 12/2013 | Craig et al. |
| 8,621,500 B2 | 12/2013 | Weaver et al. |
| 8,656,430 B2 | 2/2014 | Doyle |
| 2001/0008845 A1 | 7/2001 | Kusuda et al. |
| 2001/0049301 A1 | 12/2001 | Masuda et al. |
| 2002/0007491 A1 | 1/2002 | Schiller et al. |

(56) References Cited

U.S. PATENT DOCUMENTS

| | | |
|---|---|---|
| 2002/0013812 A1 | 1/2002 | Krueger et al. |
| 2002/0016161 A1 | 2/2002 | Dellien et al. |
| 2002/0021353 A1 | 2/2002 | DeNies |
| 2002/0026642 A1 | 2/2002 | Augenbraun et al. |
| 2002/0027567 A1 | 3/2002 | Niamir |
| 2002/0032697 A1 | 3/2002 | French et al. |
| 2002/0040482 A1 | 4/2002 | Sextro et al. |
| 2002/0047899 A1 | 4/2002 | Son et al. |
| 2002/0049975 A1 | 4/2002 | Thomas et al. |
| 2002/0054578 A1 | 5/2002 | Zhang et al. |
| 2002/0056083 A1 | 5/2002 | Istvan |
| 2002/0056107 A1 | 5/2002 | Schlack |
| 2002/0056136 A1 | 5/2002 | Wistendahl et al. ......... 725/135 |
| 2002/0059644 A1 | 5/2002 | Andrade et al. |
| 2002/0062484 A1 | 5/2002 | De Lange et al. |
| 2002/0066101 A1 | 5/2002 | Gordon et al. ................. 725/43 |
| 2002/0067766 A1 | 6/2002 | Sakamoto et al. |
| 2002/0069267 A1 | 6/2002 | Thiele |
| 2002/0072408 A1 | 6/2002 | Kumagai |
| 2002/0078171 A1 | 6/2002 | Schneider |
| 2002/0078456 A1 | 6/2002 | Hudson et al. |
| 2002/0083464 A1 | 6/2002 | Tomsen et al. |
| 2002/0095689 A1 | 7/2002 | Novak |
| 2002/0105531 A1 | 8/2002 | Niemi |
| 2002/0108121 A1 | 8/2002 | Alao et al. |
| 2002/0131511 A1 | 9/2002 | Zenoni |
| 2002/0136298 A1 | 9/2002 | Anantharamu et al. |
| 2002/0152318 A1 | 10/2002 | Menon et al. |
| 2002/0171765 A1 | 11/2002 | Waki et al. |
| 2002/0175931 A1 | 11/2002 | Holtz et al. |
| 2002/0178447 A1 | 11/2002 | Plotnick et al. |
| 2002/0188628 A1 | 12/2002 | Cooper et al. |
| 2002/0191851 A1 | 12/2002 | Keinan |
| 2002/0194592 A1 | 12/2002 | Tsuchida et al. |
| 2002/0196746 A1 | 12/2002 | Allen |
| 2003/0018796 A1 | 1/2003 | Chou et al. |
| 2003/0020671 A1 | 1/2003 | Santoro et al. |
| 2003/0027517 A1 | 2/2003 | Callway et al. |
| 2003/0035486 A1 | 2/2003 | Kato et al. |
| 2003/0038893 A1 | 2/2003 | Rajamaki et al. |
| 2003/0039398 A1 | 2/2003 | McIntyre |
| 2003/0046690 A1 | 3/2003 | Miller |
| 2003/0051253 A1 | 3/2003 | Barone, Jr. |
| 2003/0058941 A1 | 3/2003 | Chen et al. |
| 2003/0061451 A1 | 3/2003 | Beyda |
| 2003/0065739 A1 | 4/2003 | Shnier |
| 2003/0071792 A1 | 4/2003 | Safadi |
| 2003/0072372 A1 | 4/2003 | Shen et al. |
| 2003/0076546 A1* | 4/2003 | Johnson et al. ................ 358/474 |
| 2003/0088328 A1 | 5/2003 | Nishio et al. |
| 2003/0088400 A1 | 5/2003 | Nishio et al. |
| 2003/0095790 A1* | 5/2003 | Joshi ............................... 386/69 |
| 2003/0107443 A1 | 6/2003 | Yamamoto |
| 2003/0122836 A1 | 7/2003 | Doyle et al. |
| 2003/0123664 A1 | 7/2003 | Pedlow, Jr. et al. |
| 2003/0126608 A1 | 7/2003 | Safadi |
| 2003/0126611 A1 | 7/2003 | Chernock et al. |
| 2003/0131349 A1 | 7/2003 | Kuczynski-Brown |
| 2003/0135860 A1 | 7/2003 | Dureau |
| 2003/0169373 A1 | 9/2003 | Peters et al. |
| 2003/0177199 A1 | 9/2003 | Zenoni |
| 2003/0188309 A1 | 10/2003 | Yuen |
| 2003/0189980 A1 | 10/2003 | Dvir et al. |
| 2003/0196174 A1 | 10/2003 | Pierre Cote et al. |
| 2003/0208768 A1 | 11/2003 | Urdang et al. |
| 2003/0229719 A1 | 12/2003 | Iwata et al. |
| 2003/0229900 A1 | 12/2003 | Reisman |
| 2003/0231218 A1 | 12/2003 | Amadio |
| 2004/0016000 A1 | 1/2004 | Zhang et al. |
| 2004/0034873 A1 | 2/2004 | Zenoni |
| 2004/0040035 A1 | 2/2004 | Carlucci et al. |
| 2004/0055007 A1 | 3/2004 | Allport |
| 2004/0078822 A1 | 4/2004 | Breen et al. |
| 2004/0088375 A1 | 5/2004 | Sethi et al. |
| 2004/0091171 A1 | 5/2004 | Bone |
| 2004/0111526 A1 | 6/2004 | Baldwin et al. |
| 2004/0117827 A1 | 6/2004 | Karaoguz et al. |
| 2004/0128686 A1 | 7/2004 | Boyer et al. |
| 2004/0133704 A1 | 7/2004 | Krzyzanowski et al. |
| 2004/0136698 A1* | 7/2004 | Mock ............................. 386/123 |
| 2004/0139158 A1 | 7/2004 | Datta |
| 2004/0157662 A1 | 8/2004 | Tsuchiya |
| 2004/0163101 A1 | 8/2004 | Swix et al. |
| 2004/0184542 A1 | 9/2004 | Fujimoto |
| 2004/0193648 A1 | 9/2004 | Lai et al. |
| 2004/0210824 A1 | 10/2004 | Shoff et al. |
| 2004/0261106 A1 | 12/2004 | Hoffman |
| 2004/0261114 A1 | 12/2004 | Addington et al. |
| 2004/0268419 A1 | 12/2004 | Danker et al. |
| 2005/0015259 A1 | 1/2005 | Thumpudi et al. |
| 2005/0015816 A1 | 1/2005 | Christofalo et al. |
| 2005/0021830 A1 | 1/2005 | Urzaiz et al. |
| 2005/0034155 A1 | 2/2005 | Gordon et al. |
| 2005/0034162 A1 | 2/2005 | White et al. |
| 2005/0044575 A1 | 2/2005 | Der Kuyl |
| 2005/0055685 A1 | 3/2005 | Maynard et al. |
| 2005/0055721 A1 | 3/2005 | Zigmond et al. |
| 2005/0071876 A1 | 3/2005 | van Beek |
| 2005/0076134 A1 | 4/2005 | Bialik et al. |
| 2005/0089091 A1 | 4/2005 | Kim et al. |
| 2005/0091690 A1 | 4/2005 | Delpuch et al. |
| 2005/0091695 A1 | 4/2005 | Paz et al. |
| 2005/0114906 A1 | 5/2005 | Hoarty et al. |
| 2005/0132305 A1* | 6/2005 | Guichard et al. ............. 715/855 |
| 2005/0135385 A1 | 6/2005 | Jenkins et al. |
| 2005/0141613 A1 | 6/2005 | Kelly et al. |
| 2005/0149988 A1 | 7/2005 | Grannan |
| 2005/0155063 A1 | 7/2005 | Bayrakeri |
| 2005/0160088 A1 | 7/2005 | Scallan et al. |
| 2005/0166257 A1 | 7/2005 | Feinleib et al. |
| 2005/0180502 A1 | 8/2005 | Puri |
| 2005/0198682 A1 | 9/2005 | Wright |
| 2005/0213586 A1 | 9/2005 | Cyganski et al. |
| 2005/0216933 A1 | 9/2005 | Black |
| 2005/0216940 A1 | 9/2005 | Black |
| 2005/0226426 A1 | 10/2005 | Oomen et al. |
| 2005/0273832 A1 | 12/2005 | Zigmond et al. |
| 2006/0001737 A1 | 1/2006 | Dawson et al. |
| 2006/0020960 A1 | 1/2006 | Relan et al. |
| 2006/0020994 A1 | 1/2006 | Crane et al. |
| 2006/0031906 A1 | 2/2006 | Kaneda |
| 2006/0039481 A1 | 2/2006 | Shen et al. |
| 2006/0041910 A1 | 2/2006 | Hatanaka et al. |
| 2006/0088105 A1 | 4/2006 | Shen et al. |
| 2006/0095944 A1 | 5/2006 | Demircin et al. |
| 2006/0112338 A1* | 5/2006 | Joung et al. .................. 715/733 |
| 2006/0117340 A1 | 6/2006 | Pavlovskaia et al. |
| 2006/0143678 A1 | 6/2006 | Chou et al. |
| 2006/0161538 A1 | 7/2006 | Kiilerich |
| 2006/0173985 A1 | 8/2006 | Moore |
| 2006/0174026 A1 | 8/2006 | Robinson et al. |
| 2006/0174289 A1 | 8/2006 | Theberge |
| 2006/0195884 A1 | 8/2006 | van Zoest et al. |
| 2006/0203913 A1 | 9/2006 | Kim et al. |
| 2006/0212203 A1 | 9/2006 | Furuno |
| 2006/0218601 A1 | 9/2006 | Michel |
| 2006/0230428 A1 | 10/2006 | Craig et al. |
| 2006/0242570 A1 | 10/2006 | Croft et al. |
| 2006/0256865 A1 | 11/2006 | Westerman |
| 2006/0269086 A1 | 11/2006 | Page et al. |
| 2006/0271985 A1 | 11/2006 | Hoffman et al. |
| 2006/0285586 A1 | 12/2006 | Westerman |
| 2006/0285819 A1 | 12/2006 | Kelly et al. |
| 2007/0009035 A1 | 1/2007 | Craig et al. |
| 2007/0009036 A1 | 1/2007 | Craig et al. |
| 2007/0009042 A1 | 1/2007 | Craig et al. |
| 2007/0025639 A1* | 2/2007 | Zhou et al. .................... 382/284 |
| 2007/0033528 A1* | 2/2007 | Merril et al. .................. 715/732 |
| 2007/0033631 A1 | 2/2007 | Gordon et al. |
| 2007/0074251 A1 | 3/2007 | Oguz et al. |
| 2007/0079325 A1 | 4/2007 | de Heer |
| 2007/0115941 A1 | 5/2007 | Patel et al. |
| 2007/0124795 A1 | 5/2007 | McKissick et al. |
| 2007/0130446 A1 | 6/2007 | Minakami |

(56) References Cited

U.S. PATENT DOCUMENTS

| | | |
|---|---|---|
| 2007/0130592 A1 | 6/2007 | Haeusel |
| 2007/0152984 A1 | 7/2007 | Ording et al. |
| 2007/0162953 A1 | 7/2007 | Bolliger et al. |
| 2007/0172061 A1 | 7/2007 | Pinder |
| 2007/0178243 A1 | 8/2007 | Dong et al. |
| 2007/0234220 A1 | 10/2007 | Khan et al. |
| 2007/0237232 A1 | 10/2007 | Chang et al. |
| 2007/0300280 A1 | 12/2007 | Turner et al. |
| 2008/0046928 A1 | 2/2008 | Poling et al. |
| 2008/0052742 A1 | 2/2008 | Kopf et al. |
| 2008/0066135 A1 | 3/2008 | Brodersen et al. |
| 2008/0084503 A1 | 4/2008 | Kondo |
| 2008/0086688 A1 | 4/2008 | Chandratillake et al. |
| 2008/0094368 A1 | 4/2008 | Ording et al. |
| 2008/0097953 A1* | 4/2008 | Levy et al. ............... 707/1 |
| 2008/0098450 A1 | 4/2008 | Wu et al. |
| 2008/0104520 A1 | 5/2008 | Swenson et al. |
| 2008/0127255 A1 | 5/2008 | Ress et al. |
| 2008/0154583 A1 | 6/2008 | Goto et al. |
| 2008/0163059 A1* | 7/2008 | Craner ............... 715/719 |
| 2008/0163286 A1 | 7/2008 | Rudolph et al. |
| 2008/0170619 A1 | 7/2008 | Landau |
| 2008/0170622 A1 | 7/2008 | Gordon et al. |
| 2008/0178125 A1 | 7/2008 | Elsbree et al. |
| 2008/0178243 A1 | 7/2008 | Dong et al. |
| 2008/0178249 A1 | 7/2008 | Gordon et al. |
| 2008/0181221 A1 | 7/2008 | Kampmann et al. |
| 2008/0184120 A1 | 7/2008 | O-Brien-Strain et al. |
| 2008/0189740 A1 | 8/2008 | Carpenter et al. |
| 2008/0195573 A1 | 8/2008 | Onoda et al. |
| 2008/0201736 A1 | 8/2008 | Gordon et al. |
| 2008/0212942 A1 | 9/2008 | Gordon et al. |
| 2008/0222199 A1 | 9/2008 | Tiu et al. |
| 2008/0232452 A1 | 9/2008 | Sullivan et al. |
| 2008/0243918 A1 | 10/2008 | Holtman |
| 2008/0243998 A1 | 10/2008 | Oh et al. |
| 2008/0246759 A1* | 10/2008 | Summers ............... 345/420 |
| 2008/0253440 A1 | 10/2008 | Srinivasan et al. |
| 2008/0271080 A1 | 10/2008 | Gossweiler et al. |
| 2009/0003446 A1 | 1/2009 | Wu et al. |
| 2009/0003705 A1 | 1/2009 | Zou et al. |
| 2009/0007199 A1 | 1/2009 | La Joie |
| 2009/0025027 A1 | 1/2009 | Craner |
| 2009/0031341 A1 | 1/2009 | Schlack et al. |
| 2009/0041118 A1 | 2/2009 | Pavlovskaia et al. |
| 2009/0083781 A1 | 3/2009 | Yang et al. |
| 2009/0083813 A1 | 3/2009 | Dolce et al. |
| 2009/0083824 A1 | 3/2009 | McCarthy et al. |
| 2009/0089188 A1 | 4/2009 | Ku et al. |
| 2009/0094113 A1 | 4/2009 | Berry et al. |
| 2009/0094646 A1 | 4/2009 | Walter et al. |
| 2009/0100465 A1 | 4/2009 | Kulakowski |
| 2009/0100489 A1 | 4/2009 | Strothmann |
| 2009/0106269 A1 | 4/2009 | Zuckerman et al. |
| 2009/0106386 A1 | 4/2009 | Zuckerman et al. |
| 2009/0106392 A1 | 4/2009 | Zuckerman et al. |
| 2009/0106425 A1 | 4/2009 | Zuckerman et al. |
| 2009/0106441 A1 | 4/2009 | Zuckerman et al. |
| 2009/0106451 A1 | 4/2009 | Zuckerman et al. |
| 2009/0106511 A1 | 4/2009 | Zuckerman et al. |
| 2009/0113009 A1 | 4/2009 | Slemmer et al. |
| 2009/0132942 A1 | 5/2009 | Santoro et al. |
| 2009/0138966 A1 | 5/2009 | Krause et al. |
| 2009/0144781 A1 | 6/2009 | Glaser et al. |
| 2009/0146779 A1 | 6/2009 | Kumar et al. |
| 2009/0157868 A1 | 6/2009 | Chaudhry |
| 2009/0158369 A1 | 6/2009 | Van Vleck et al. |
| 2009/0160694 A1 | 6/2009 | Di Flora |
| 2009/0172757 A1 | 7/2009 | Aldrey et al. |
| 2009/0178098 A1 | 7/2009 | Westbrook et al. |
| 2009/0183219 A1 | 7/2009 | Maynard et al. |
| 2009/0189890 A1 | 7/2009 | Corbett et al. |
| 2009/0193452 A1 | 7/2009 | Russ et al. |
| 2009/0196346 A1 | 8/2009 | Zhang et al. |
| 2009/0210899 A1 | 8/2009 | Lawrence-Apfelbaum et al. |
| 2009/0225790 A1 | 9/2009 | Shay et al. |
| 2009/0228620 A1 | 9/2009 | Thomas et al. |
| 2009/0228922 A1 | 9/2009 | Haj-Khalil et al. |
| 2009/0233593 A1 | 9/2009 | Ergen et al. |
| 2009/0251478 A1 | 10/2009 | Maillot et al. |
| 2009/0254960 A1 | 10/2009 | Yarom et al. |
| 2009/0265617 A1 | 10/2009 | Randall et al. |
| 2009/0271512 A1 | 10/2009 | Jorgensen |
| 2009/0271818 A1 | 10/2009 | Schlack |
| 2009/0298535 A1 | 12/2009 | Klein et al. |
| 2009/0313674 A1 | 12/2009 | Ludvig et al. |
| 2009/0328109 A1 | 12/2009 | Pavlovskaia et al. |
| 2010/0033638 A1 | 2/2010 | O'Donnell et al. |
| 2010/0035682 A1 | 2/2010 | Gentile et al. |
| 2010/0058404 A1 | 3/2010 | Rouse |
| 2010/0067571 A1 | 3/2010 | White et al. |
| 2010/0077441 A1 | 3/2010 | Thomas et al. |
| 2010/0104021 A1 | 4/2010 | Schmit |
| 2010/0115573 A1 | 5/2010 | Srinivasan et al. |
| 2010/0118972 A1 | 5/2010 | Zhang et al. |
| 2010/0131996 A1 | 5/2010 | Gauld |
| 2010/0146139 A1 | 6/2010 | Brockmann |
| 2010/0158109 A1 | 6/2010 | Dahlby et al. |
| 2010/0161825 A1 | 6/2010 | Ronca et al. |
| 2010/0166071 A1 | 7/2010 | Wu et al. |
| 2010/0174776 A1 | 7/2010 | Westberg et al. |
| 2010/0175080 A1 | 7/2010 | Yuen et al. |
| 2010/0180307 A1 | 7/2010 | Hayes et al. |
| 2010/0226428 A1 | 9/2010 | Thevathasan et al. |
| 2010/0235861 A1 | 9/2010 | Schein et al. |
| 2010/0242073 A1 | 9/2010 | Gordon et al. |
| 2010/0254370 A1 | 10/2010 | Jana et al. |
| 2010/0265344 A1 | 10/2010 | Velarde et al. |
| 2010/0325655 A1 | 12/2010 | Perez |
| 2010/0325668 A1 | 12/2010 | Young et al. |
| 2011/0002376 A1 | 1/2011 | Ahmed et al. |
| 2011/0002470 A1 | 1/2011 | Purnhagen et al. |
| 2011/0023069 A1 | 1/2011 | Dowens |
| 2011/0035227 A1 | 2/2011 | Lee et al. |
| 2011/0067061 A1 | 3/2011 | Karaoguz et al. |
| 2011/0096828 A1 | 4/2011 | Chen et al. |
| 2011/0107375 A1 | 5/2011 | Stahl et al. |
| 2011/0110642 A1 | 5/2011 | Salomons et al. |
| 2011/0153776 A1 | 6/2011 | Opala et al. |
| 2011/0167468 A1 | 7/2011 | Lee et al. |
| 2011/0191684 A1 | 8/2011 | Greenberg |
| 2011/0231878 A1 | 9/2011 | Hunter et al. |
| 2011/0243024 A1 | 10/2011 | sterling et al. |
| 2011/0258584 A1 | 10/2011 | Williams et al. |
| 2011/0289536 A1 | 11/2011 | Poder et al. |
| 2011/0296312 A1 | 12/2011 | Boyer et al. |
| 2011/0317982 A1 | 12/2011 | Xu et al. |
| 2012/0137337 A1 | 5/2012 | Sigmon et al. |
| 2012/0204217 A1 | 8/2012 | Regis et al. |
| 2012/0224641 A1 | 9/2012 | Haberman et al. |
| 2012/0257671 A1 | 10/2012 | Brockmann et al. |
| 2013/0003826 A1 | 1/2013 | Craig et al. |
| 2013/0071095 A1 | 3/2013 | Chauvier et al. |
| 2013/0086610 A1 | 4/2013 | Brockmann |
| 2013/0179787 A1 | 7/2013 | Brockmann et al. |
| 2013/0198776 A1 | 8/2013 | Brockmann |
| 2013/0254308 A1 | 9/2013 | Rose et al. |
| 2013/0272394 A1 | 10/2013 | Brockmann et al. |
| 2013/0304818 A1 | 11/2013 | Brumleve et al. |
| 2014/0081954 A1 | 3/2014 | Elizarov |
| 2014/0267074 A1 | 9/2014 | Balci |

FOREIGN PATENT DOCUMENTS

| | | |
|---|---|---|
| AT | 250313 T | 10/2003 |
| AT | 472152 T | 7/2010 |
| AT | 475266 T | 8/2010 |
| AU | 550086 B2 | 2/1986 |
| AU | 199060189 | 11/1990 |
| AU | 620735 B2 | 2/1992 |
| AU | 199184838 | 4/1992 |
| AU | 643828 B2 | 11/1993 |
| AU | 2004253127 A1 | 1/2005 |
| AU | 2005278122 A1 | 3/2006 |

(56) References Cited

FOREIGN PATENT DOCUMENTS

| | | |
|---|---|---|
| AU | 2010339376 A1 | 8/2012 |
| AU | 2011249132 A1 | 11/2012 |
| AU | 2011258972 A1 | 11/2012 |
| AU | 2011315950 A1 | 5/2013 |
| CA | 682776 A | 3/1964 |
| CA | 2052477 | 3/1992 |
| CA | 1302554 | 6/1992 |
| CA | 2163500 | 5/1996 |
| CA | 2231391 A1 | 5/1997 |
| CA | 2273365 A1 | 6/1998 |
| CA | 2313133 A1 | 6/1999 |
| CA | 2313161 A1 | 6/1999 |
| CA | 2528499 A1 | 1/2005 |
| CA | 2569407 A1 | 3/2006 |
| CA | 2728797 A1 | 4/2010 |
| CA | 2787913 A1 | 7/2011 |
| CA | 2798541 A1 | 12/2011 |
| CA | 2814070 A1 | 4/2012 |
| CN | 1507751 A | 6/2004 |
| CN | 1969555 A | 5/2007 |
| CN | 101180109 A | 5/2008 |
| CN | 101627424 A | 1/2010 |
| CN | 101637023 A | 1/2010 |
| CN | 102007773 A | 4/2011 |
| CN | 103647980 A | 3/2014 |
| DE | 4408355 A1 | 10/1994 |
| DE | 69516139 D1 | 12/2000 |
| DE | 69132518 D1 | 9/2001 |
| DE | 69333207 D1 | 7/2004 |
| DE | 98961961 T1 | 8/2007 |
| DE | 602008001596 D1 | 8/2010 |
| DE | 602006015650 D1 | 9/2010 |
| EP | 0093549 A2 | 11/1983 |
| EP | 0128771 A2 | 12/1984 |
| EP | 0419137 A2 | 3/1991 |
| EP | 0449633 A1 | 10/1991 |
| EP | 0477786 A2 | 4/1992 |
| EP | 0523618 A2 | 1/1993 |
| EP | 0534139 A2 | 3/1993 |
| EP | 0568453 A1 | 11/1993 |
| EP | 0588653 A2 | 3/1994 |
| EP | 0594350 A1 | 4/1994 |
| EP | 0612916 A2 | 8/1994 |
| EP | 0624039 A2 | 11/1994 |
| EP | 0638219 A1 | 2/1995 |
| EP | 0643523 A1 | 3/1995 |
| EP | 0661888 A2 | 7/1995 |
| EP | 0714684 A1 | 6/1996 |
| EP | 0746158 A2 | 12/1996 |
| EP | 0761066 A1 | 3/1997 |
| EP | 0789972 A1 | 8/1997 |
| EP | 0830786 A1 | 3/1998 |
| EP | 0861560 A1 | 9/1998 |
| EP | 0 881 808 A2 | 12/1998 |
| EP | 0933966 | 8/1999 |
| EP | 0933966 A1 | 8/1999 |
| EP | 1026872 A1 | 8/2000 |
| EP | 1038397 A1 | 9/2000 |
| EP | 1038399 A1 | 9/2000 |
| EP | 1038400 A1 | 9/2000 |
| EP | 1038401 A1 | 9/2000 |
| EP | 1051039 A2 | 11/2000 |
| EP | 1055331 A1 | 11/2000 |
| EP | 1120968 A1 | 8/2001 |
| EP | 1345446 A1 | 9/2003 |
| EP | 1422929 A2 | 5/2004 |
| EP | 1428562 A2 | 6/2004 |
| EP | 1521476 A1 | 4/2005 |
| EP | 1645115 A1 | 4/2006 |
| EP | 1 725 044 A2 | 11/2006 |
| EP | 1767708 A2 | 3/2007 |
| EP | 1771003 A1 | 4/2007 |
| EP | 1772014 A1 | 4/2007 |
| EP | 1877150 A1 | 1/2008 |
| EP | 1887148 A2 | 2/2008 |
| EP | 1900200 A1 | 3/2008 |
| EP | 1902583 A1 | 3/2008 |
| EP | 1908293 A1 | 4/2008 |
| EP | 1911288 A2 | 4/2008 |
| EP | 1918802 A1 | 5/2008 |
| EP | 2100296 A1 | 9/2009 |
| EP | 2105019 A2 | 9/2009 |
| EP | 2106665 A2 | 10/2009 |
| EP | 2116051 A2 | 11/2009 |
| EP | 2124440 A1 | 11/2009 |
| EP | 2248341 A1 | 11/2010 |
| EP | 2269377 A2 | 1/2011 |
| EP | 2271098 A1 | 1/2011 |
| EP | 2304953 A2 | 4/2011 |
| EP | 2364019 A2 | 9/2011 |
| EP | 2384001 A1 | 11/2011 |
| EP | 2409493 A2 | 1/2012 |
| EP | 2477414 A2 | 7/2012 |
| EP | 2487919 A2 | 8/2012 |
| EP | 2520090 A2 | 11/2012 |
| EP | 2567545 A1 | 3/2013 |
| EP | 2577437 A1 | 4/2013 |
| EP | 2628306 A2 | 8/2013 |
| EP | 2632164 A2 | 8/2013 |
| EP | 2632165 A2 | 8/2013 |
| EP | 2695388 A2 | 2/2014 |
| ES | 2207635 T3 | 6/2004 |
| FR | 8211463 A | 6/1982 |
| FR | 2529739 | 1/1984 |
| FR | 2891098 | 3/2007 |
| GB | 2207838 A | 2/1989 |
| GB | 2248955 A | 4/1992 |
| GB | 2290204 A | 12/1995 |
| GB | 2365649 A | 2/2002 |
| GB | 2378345 | 2/2003 |
| HK | 1134855 A1 | 10/2010 |
| HK | 1116323 A1 | 12/2010 |
| IE | 19913397 A1 | 4/1992 |
| IL | 99586 A | 2/1998 |
| IL | 215133 | 12/2011 |
| IL | 222829 | 12/2012 |
| IL | 222830 | 12/2012 |
| IL | 225525 | 6/2013 |
| IN | 180215 B | 1/1998 |
| IN | 200701744 P3 | 11/2007 |
| IN | 200900856 P3 | 5/2009 |
| IN | 200800214 P3 | 6/2009 |
| IS | 3759 A7 | 3/1992 |
| JP | 60-054324 A | 3/1985 |
| JP | 63-033988 | 2/1988 |
| JP | 63-263985 A | 10/1988 |
| JP | 2001-241993 A | 9/1989 |
| JP | 04-373286 A | 12/1992 |
| JP | 06-054324 A | 2/1994 |
| JP | 7015720 A | 1/1995 |
| JP | 7-160292 A | 6/1995 |
| JP | 8-265704 A | 10/1996 |
| JP | 10-228437 A | 8/1998 |
| JP | 10-510131 | 9/1998 |
| JP | 11-134273 A | 5/1999 |
| JP | H11-261966 | 9/1999 |
| JP | 2000-152234 | 5/2000 |
| JP | 2001-203995 A | 7/2001 |
| JP | 2001-245271 | 9/2001 |
| JP | 2001-245291 | 9/2001 |
| JP | 2001-514471 | 9/2001 |
| JP | 2002-016920 | 1/2002 |
| JP | 2002-057952 A | 2/2002 |
| JP | 2002-112220 A | 4/2002 |
| JP | 2002-141810 A | 5/2002 |
| JP | 2002-208027 | 7/2002 |
| JP | 2002-319991 | 10/2002 |
| JP | 2003-506763 A | 2/2003 |
| JP | 2003-087785 | 3/2003 |
| JP | 2003-529234 | 9/2003 |
| JP | 2004-501445 A | 1/2004 |
| JP | 2004-056777 A | 2/2004 |
| JP | 2004-110850 | 4/2004 |
| JP | 2004-112441 | 4/2004 |

(56) References Cited

FOREIGN PATENT DOCUMENTS

| | | | |
|---|---|---|---|
| JP | 2004-135932 A | 5/2004 | |
| JP | 2004-264812 A | 9/2004 | |
| JP | 2004-312283 | 11/2004 | |
| JP | 2004-533736 A | 11/2004 | |
| JP | 2004-536381 A | 12/2004 | |
| JP | 2004-536681 | 12/2004 | |
| JP | 2005-033741 | 2/2005 | |
| JP | 2005-084987 A | 3/2005 | |
| JP | 2005-095599 | 3/2005 | |
| JP | 8-095599 A | 4/2005 | |
| JP | 2005-156996 | 6/2005 | |
| JP | 2005-519382 | 6/2005 | |
| JP | 2005-523479 A | 8/2005 | |
| JP | 2005-309752 | 11/2005 | |
| JP | 2006-067280 | 3/2006 | |
| JP | 2006-512838 | 4/2006 | |
| JP | 2007-129296 | 5/2007 | |
| JP | 2007-522727 | 8/2007 | |
| JP | 11-88419 | 9/2007 | |
| JP | 2008-523880 | 7/2008 | |
| JP | 2008-535622 A | 9/2008 | |
| JP | 04252727 B2 | 4/2009 | |
| JP | 2009-543386 A | 12/2009 | |
| JP | 2011-108155 A | 6/2011 | |
| JP | 2012-080593 A | 4/2012 | |
| JP | 04996603 B2 | 8/2012 | |
| JP | 05121711 B2 | 1/2013 | |
| JP | 53-004612 A | 10/2013 | |
| JP | 05331008 B2 | 10/2013 | |
| JP | 05405819 B2 | 2/2014 | |
| KR | 10-2005-0001362 | 1/2005 | |
| KR | 10-2005-0085827 | 8/2005 | |
| KR | 2006067924 A | 6/2006 | |
| KR | 10-2006-0095821 | 9/2006 | |
| KR | 2007038111 A | 4/2007 | |
| KR | 20080001298 A | 1/2008 | |
| KR | 2008024189 A | 3/2008 | |
| KR | 2010111739 A | 10/2010 | |
| KR | 2010120187 A | 11/2010 | |
| KR | 2010127240 A | 12/2010 | |
| KR | 2011030640 A | 3/2011 | |
| KR | 2011129477 A | 12/2011 | |
| KR | 20120112683 A | 10/2012 | |
| KR | 2013061149 A | 6/2013 | |
| KR | 2013113925 A | 10/2013 | |
| KR | 1333200 B1 | 11/2013 | |
| KR | 2008045154 A | 11/2013 | |
| KR | 2013138263 A | 12/2013 | |
| NL | 1032594 C2 | 4/2008 | ............... H04N 7/24 |
| NL | 1033929 C1 | 4/2008 | ............... H04N 7/26 |
| NL | 2004670 A | 11/2011 | |
| NL | 2004780 A | 1/2012 | |
| NZ | 239969 A | 12/1994 | |
| PT | 99110 A | 12/1993 | |
| WO | WO 8202303 A1 | 7/1982 | |
| WO | WO 8908967 A1 | 9/1989 | |
| WO | WO 90/13972 A1 | 11/1990 | |
| WO | WO 93/22877 A2 | 11/1993 | |
| WO | WO 9416534 A2 | 7/1994 | |
| WO | WO 9419910 A1 | 9/1994 | |
| WO | WO 9421079 A1 | 9/1994 | |
| WO | WO 95/15658 A1 | 6/1995 | |
| WO | WO 9532587 A1 | 11/1995 | |
| WO | WO 95/33342 | 12/1995 | |
| WO | WO 9614712 A1 | 5/1996 | |
| WO | WO 9627843 A1 | 9/1996 | |
| WO | WO 9631826 A1 | 10/1996 | |
| WO | WO 96/37074 A2 | 11/1996 | |
| WO | WO 9642168 A1 | 12/1996 | |
| WO | WO 9716925 A1 | 5/1997 | |
| WO | WO 9733434 A1 | 9/1997 | |
| WO | WO 9739583 A1 | 10/1997 | |
| WO | WO 9826595 A1 | 6/1998 | |
| WO | WO 99/00735 A1 | 1/1999 | |
| WO | WO 99/04568 | 1/1999 | |
| WO | WO 9900735 A1 | 1/1999 | |
| WO | WO 9930496 A1 | 6/1999 | |
| WO | WO 9930497 A1 | 6/1999 | |
| WO | WO 9930500 A1 | 6/1999 | |
| WO | WO 9930501 A1 | 6/1999 | |
| WO | WO 9935840 A1 | 7/1999 | |
| WO | WO 9941911 A1 | 8/1999 | |
| WO | WO 9956468 A1 | 11/1999 | |
| WO | WO 99/65232 A1 | 12/1999 | |
| WO | WO 99/65243 A1 | 12/1999 | |
| WO | WO 99/66732 A1 | 12/1999 | |
| WO | WO 0002303 A1 | 1/2000 | |
| WO | WO 00/07372 A1 | 2/2000 | |
| WO | WO 00/08967 A1 | 2/2000 | |
| WO | WO 00/19910 A1 | 4/2000 | |
| WO | WO 00/38430 A1 | 6/2000 | |
| WO | WO 00/41397 A1 | 7/2000 | |
| WO | WO 01/39494 A1 | 5/2001 | |
| WO | WO 01/41447 A1 | 6/2001 | |
| WO | WO 01/82614 A1 | 11/2001 | |
| WO | WO 01/92973 | 12/2001 | |
| WO | WO 02/089487 A2 | 7/2002 | |
| WO | WO 02/076097 | 9/2002 | |
| WO | WO 02/076099 A1 | 9/2002 | |
| WO | WO 03/026232 A1 | 3/2003 | |
| WO | WO 03/026275 A2 | 3/2003 | |
| WO | WO 03/047710 A2 | 6/2003 | |
| WO | WO 03/065683 A1 | 8/2003 | |
| WO | WO 03/071727 A2 | 8/2003 | |
| WO | WO 03/091832 A2 | 11/2003 | |
| WO | WO 2004/012437 A2 | 2/2004 | |
| WO | WO 2004/018060 A2 | 3/2004 | |
| WO | WO2004/057609 A1 | 7/2004 | |
| WO | WO 2004/073310 A1 | 8/2004 | |
| WO | WO 2005/002215 A1 | 1/2005 | |
| WO | WO 2005/041122 A2 | 5/2005 | |
| WO | WO 2005/053301 A2 | 6/2005 | |
| WO | WO2005/076575 | 8/2005 | |
| WO | WO 2005/120067 A2 | 12/2005 | |
| WO | WO 2006/014362 A1 | 2/2006 | |
| WO | WO 2006/022881 A1 | 3/2006 | |
| WO | WO 2006/053305 A2 | 5/2006 | |
| WO | WO 2006/067697 A2 | 6/2006 | |
| WO | WO 2006/081634 A2 | 8/2006 | |
| WO | WO 2006/105480 A1 | 10/2006 | |
| WO | WO 2006/110268 A1 | 10/2006 | |
| WO | WO 2007/001797 A1 | 1/2007 | |
| WO | WO 2007/008319 A1 | 1/2007 | |
| WO | WO 2007/008355 A2 | 1/2007 | |
| WO | WO 2007/008356 A1 | 1/2007 | |
| WO | WO 2007/008357 A1 | 1/2007 | |
| WO | WO 2007/008358 A1 | 1/2007 | |
| WO | WO 2007/018722 A2 | 2/2007 | |
| WO | WO 2007/018726 A2 | 2/2007 | |
| WO | WO2008/044916 A1 | 4/2008 | |
| WO | WO 2008/044916 A2 | 4/2008 | |
| WO | WO 2008/086170 A1 | 7/2008 | |
| WO | WO 2008/088741 A2 | 7/2008 | |
| WO | WO 2008/088752 A2 | 7/2008 | |
| WO | WO 2008/088772 A2 | 7/2008 | |
| WO | WO 2008/100205 A1 | 8/2008 | |
| WO | WO2009/038596 | 3/2009 | |
| WO | WO 2009/038596 A1 | 3/2009 | |
| WO | WO 2009/099893 A1 | 8/2009 | |
| WO | WO 2009/099895 A1 | 8/2009 | |
| WO | WO 2009/105465 A2 | 8/2009 | |
| WO | WO 2009/110897 A1 | 9/2009 | |
| WO | WO 2009/114247 A2 | 9/2009 | |
| WO | WO 2009/155214 A2 | 12/2009 | |
| WO | WO 2010/044926 A3 | 4/2010 | |
| WO | WO 2010/054136 A2 | 5/2010 | |
| WO | WO 2010/107954 A2 | 9/2010 | |
| WO | WO 2011/014336 A1 | 9/2010 | |
| WO | WO 2011/082364 A2 | 7/2011 | |
| WO | WO 2011/139155 A1 | 11/2011 | |
| WO | WO 2011/149357 A1 | 12/2011 | |
| WO | WO 2012/051528 A2 | 4/2012 | |
| WO | WO 2012/138660 A2 | 10/2012 | |

(56) References Cited

FOREIGN PATENT DOCUMENTS

| WO | WO 2013/106390 A1 | 7/2013 |
|---|---|---|
| WO | WO 2013/155310 A1 | 7/2013 |
| WO | WO2013/184604 A1 | 12/2013 |

OTHER PUBLICATIONS

Authorized Officer Jürgen Güttlich, International Search Report and Written Opinion, dated Jan. 12, 2007, PCT/US2008/000450.
Hoarty, W. L., "The Smart Headend—A Novel Approach to Interactive Television", Montreux Int'l TV Symposium, Jun. 9, 1995.
Rob Koenen, "MPEG-4 Overview—Overview of the MPEG-4 Standard" Internet Citation, Mar. 2001.
MSDL, "MSDL Specification Version 1.1" Joint Video Team of ISO/IEC MPEG & ITU-T VCEG (ISO/IEC JTC1/SC29/WG11 and ITU-T SG16 Q6). No. N1246, Mar. 1996, pp. 1-99.
Stoll, G., et al., "GMF4ITV: Neue Wege Zur Interaktivität Mit Bewegten Objekten Beim Digitalen Fernsehen," *FKT Fernseh Und Kinotechnik*, Fachverlag Schiele & Schon Gmgh., vol. 60, No. 4, Jan. 1, 2006, pp. 172-178.
Avaro, O., et al., "MPEG-4 Systems: Overview," *Signal Processing*, vol. 15, Jan. 1, 2000, pp. 281-298.
Karin Exner, International Search Report, PCT/US2008/000450, Jan. 26, 2009, 9 pages.
AC-3 digital audio compression standard, Extract, Dec. 20, 1995, 11 pgs.
ActiveVideo Networks BV, International Preliminary Report on Patentability, PCT/NL2011/050308, Sep. 6, 2011, 8 pgs.
ActiveVideo Networks BV, International Search Report and Written Opinion, PCT/NL2011/050308, Sep. 6, 2011, 8 pgs.
Activevideo Networks Inc., International Preliminary Report on Patentability, PCT/US2011/056355, Apr. 16, 2013, 4 pgs.
ActiveVideo Networks Inc., International Preliminary Report on Patentability, PCT/US2012/032010, Oct. 8, 2013, 4 pgs.
ActiveVideo Networks Inc., International Search Report and Written Opinion, PCT/US2011/056355, Apr. 13, 2012, 6 pgs.
ActiveVideo Networks Inc., International Search Report and Written Opinion, PCT/US2012/032010, Oct. 10, 2012, 6 pgs.
ActiveVideo Networks Inc., International Search Report and Written Opinion, PCT/US2013/020769, May 9, 2013, 9 pgs.
ActiveVideo Networks Inc., International Search Report and Written Opinion, PCT/US2013/036182, Jul. 29, 2013, 12 pgs.
ActiveVideo Networks, Inc., International Search Report and Written Opinion, PCT/US2009/032457, Jul. 22, 2009, 7 pgs.
AcitveVideo Networks Inc., Korean Intellectual Property Office, International Search Report; PCT/US2009/032457, Jul. 22, 2009, 7 pgs.
Annex C—Video buffering verifier, information technology—generic coding of moving pictures and associated audio information: video, Feb. 2000, 6 pgs.
Antonoff, Michael, "Interactive Television," Popular Science, Nov. 1992, 12 pages.
Avinity Systems B.V., Extended European Search Report, Application No. 12163713.6, 10 pgs.
Avinity Systems B.V., Extended European Search Report, Application No. 12163712-8, 10 pgs.
Benjelloun, A summation algorithm for MPEG-1 coded audio signals: a first step towards audio processed domain, 2000, 9 pgs.
Broadhead, Direct manipulation of MPEG compressed digital audio, Nov. 5-9, 1995, 41 pgs.
Cable Television Laboratories, Inc., "CableLabs Asset Distribution Interface Specification, Version 1.1", May 5, 2006, 33 pgs.
CD 11172-3, Coding of moving pictures and associated audio for digital storage media at up to about 1.5 MBIT, Jan. 1, 1992, 39 pgs.
Craig, Notice of Allowance, U.S. Appl. No. 11/178,176, Dec. 23, 2010, 8 pgs.
Craig, Notice of Allowance, U.S. Appl. No. 11/178,183, Jan. 12, 2012, 7 pgs.
Craig, Notice of Allowance, U.S. Appl. No. 11/178,183, Jul. 19, 2012, 8 pgs.
Craig, Notice of Allowance, U.S. Appl. No. 11/178,189, Oct. 12, 2011, 7 pgs.
Craig, Notice of Allowance, U.S. Appl. No. 11/178,176, Mar. 23, 2011, 8 pgs.
Craig, Notice of Allowance, U.S. Appl. No. 13/609,183, Aug. 26, 2013, 8 pgs.
Craig, Final Office Action, U.S. Appl. No. 11/103,838, Feb. 5, 2009, 30 pgs.
Craig, Final Office Action, U.S. Appl. No. 11/178,181, Aug. 25, 2010, 17 pgs.
Craig, Final Office Action, U.S. Appl. No. 11/103,838, Jul. 6, 2010, 35 pgs.
Craig, Final Office Action, U.S. Appl. No. 11/178,176, Oct. 10, 2010, 8 pgs.
Craig, Final Office Action, U.S. Appl. No. 11/178,183, Apr. 13, 2011, 16 pgs.
Craig, Final Office Action, U.S. Appl. No. 11/178,177, Oct. 26, 2010, 12 pgs.
Craig, Final Office Action, U.S. Appl. No. 11/178,181, Jun. 20, 2011, 21 pgs.
Craig, Office Action, U.S. Appl. No. 11/103,838, May 12, 2009, 32 pgs.
Craig, Office Action, U.S. Appl. No. 11/103,838, Aug. 19, 2008, 17 pgs.
Craig, Office Action, U.S. Appl. No. 11/103,838, Nov. 19, 2009, 34 pgs.
Craig, Office Action, U.S. Appl. No. 11/178,176, May 6, 2010, 7 pgs.
Craig, Office-Action, U.S. Appl. No. 11/178,177, Mar. 29, 2011, 15 pgs.
Craig, Office Action, U.S. Appl. No. 11/178,177, Aug. 3, 2011, 26 pgs.
Craig, Office Action, U.S. Appl. No. 11/178,177, Mar. 29, 2010, 11 pgs.
Craig, Office Action, U.S. Appl. No. 11/178,181, Feb. 11, 2011, 19 pgs.
Craig, Office Action, U.S. Appl. No. 11/178,181, Mar. 29, 2010, 10 pgs.
Craig, Office Action, U.S. Appl. No. 11/178,182, Feb. 23, 2010, 15 pgs.
Craig, Office Action, U.S. Appl. No. 11/178,183, Dec. 6, 2010, 12 pgs.
Craig, Office Action, U.S. Appl. No. 11/178,183, Sep. 15, 2011, 12 pgs.
Craig, Office Action, U.S. Appl. No. 11/178,183, Feb. 19, 2010, 17 pgs.
Craig, Office Action, U.S. Appl. No. 11/178,183, Jul. 20, 2010, 13 pgs.
Craig, Office Action, U.S. Appl. No. 11/178,189, Nov. 9, 2010, 13 pgs.
Craig, Office Action, U.S. Appl. No. 11/178,189, Mar. 15, 2010, 11 pgs.
Craig, Office Action, U.S. Appl. No. 11/178,189, Jul. 23, 2009, 10 pgs.
Craig, Office Action, U.S. Appl. No. 11/178,189, May 26, 2011, 14 pgs.
Craig, Office Action, U.S. Appl. No. 13/609,183, May 9, 2013, 7 pgs.
Pavlovskaia, Office Action, JP 2011-516499, Feb. 14, 2014, 19 pgs.
Digital Audio Compression Standard(AC-3, E-AC-3), Advanced Television Systems Committee, Jun. 14, 2005, 236 pgs.
European Patent Office, Extended European Search Report for International Application No. PCT/US2010/027724, dated Jul. 24, 2012, 11 pages.
FFMPEG, http://www.ffmpeq.orq, downloaded Apr. 8, 2010, 8 pgs.
FFMEG-0.4.9 Audio Layer 2 Tables Including Fixed Psycho Acoustic Model, 2001, 2 pgs.
Herr, Notice of Allowance, U.S. Appl. No. 11/620,593, May 23, 2012, 5 pgs.
Herr, Notice of Allowance, U.S. Appl. No. 12/534,016, Feb. 7, 2012, 5 pgs.
Herr, Notice of Allowance, U.S. Appl. No. 12/534,016, Sep. 28, 2011, 15 pgs.
Herr, Final Office Action, U.S. Appl. No. 11/620,593, Sep. 15, 2011, 104 pgs.

(56) References Cited

OTHER PUBLICATIONS

Herr, Office Action, U.S. Appl. No. 11/620,593, Mar. 19, 2010, 58 pgs.
Herr, Office Action, U.S. Appl. No. 11/620,593, Apr. 21, 2009 27 pgs.
Herr, Office Action, U.S. Appl. No. 11/620,593, Dec. 23, 2009, 58 pgs.
Herr, Office Action, U.S. Appl. No. 11/620,593, Jan. 24, 2011, 96 pgs.
Herr, Office Action, U.S. Appl. No. 11/620,593, Aug. 27, 2010, 41 pgs.
Herre, Thoughts on an SAOC Architecture, Oct. 2006, 9 pgs.
ICTV, Inc., International Preliminary Report on Patentability, PCT/US2006/022585, Jan. 29, 2008, 9 pgs.
ICTV, Inc., International Search Report / Written Opinion, PCT/US2006/022585, Oct. 12, 2007, 15 pgs.
ICTV, Inc., International Search Report / Written Opinion, PCT/US2008/000419, May 15, 2009, 20 pgs.
ICTV, Inc., International Search Report / Written Opinion; PCT/US2006/022533, Nov. 20, 2006; 8 pgs.
Isovic, Timing constraints of MPEG-2 decoding for high quality video: misconceptions and realistic assumptions, Jul. 2-4, 2003, 10 pgs.
MPEG-2 Video elementary stream supplemental information, Dec. 1999, 12 pgs.
Ozer, Video Compositing 101. available from http://www.emedialive.com, Jun. 2, 2004, 5pgs.
Porter, Compositing Digital Images, 18 Computer Graphics (No. 3), Jul. 1984, pp. 253-259.
RSS Advisory Board, "RSS 2.0 Specification", published Oct. 15, 2007.
SAOC use cases, draft requirements and architecture, Oct. 2006, 16 pgs.
Sigmon, Final Office Action, U.S. Appl. No. 11/258,602, Feb. 23, 2009, 15 pgs.
Sigmon, Office Action, U.S. Appl. No. 11/258,602, Sep. 2, 2008, 12 pgs.
TAG Networks, Inc., Communication pursuant to Article 94(3) EPC, European Patent Application, 06773714.8, May 6, 2009, 3 pgs.
TAG Networks Inc, Decision to Grant a Patent, JP 209-544985, Jun. 28, 2013, 1 pg.
TAG Networks Inc., IPRP, PCT/US2006/010080, Oct. 16, 2007, 6 pgs.
TAG Networks Inc., IPRP, PCT/US2006/024194, Jan. 10, 2008, 7 pgs.
TAG Networks Inc., IPRP, PCT/US2006/024195, Apr. 1, 2009, 11 pgs.
TAG Networks Inc., IPRP, PCT/US2006/024196, Jan. 10, 2008, 6 pgs.
TAG Networks Inc., International Search Report, PCT/US2008/050221, Jun. 12, 2008, 9 pgs.
TAG Networks Inc., Office Action, CN 200680017662.3, Apr. 26, 2010, 4 pgs.
TAG Networks Inc., Office Action, EP 06739032.8, Aug. 14, 2009, 4 pgs.
TAG Networks Inc., Office Action, EP 06773714.8, May 6, 2009, 3 pgs.
TAG Networks Inc., Office Action, EP 06773714.8, Jan. 12, 2010, 4 pgs.
TAG Networks Inc., Office Action, JP 2008-506474, Oct. 10, 2012, 5 pgs.
TAG Networks Inc., Office Action, JP 2008-506474, Aug. 8, 2011, 5 pgs.
TAG Networks Inc., Office Action, JP 2008-520254, Oct. 20, 2011, 2 pgs.
TAG Networks, IPRP, PCT/US2008/050221, Jul. 7, 2009, 6 pgs.
TAG Networks, International Search Report, PCT/US2010/041133, Oct. 19, 2010, 13 pgs.
TAG Networks, Office Action, CN 200880001325.4, Jun. 22, 2011, 4 pgs.
TAG Networks, Office Action, JP 2009-544985, Feb. 25, 2013, 3 pgs.
Talley, A general framework for continuous media transmission control, Oct. 13-16, 1997, 10 pgs.
The Toolame Project, Psych_nl.c, 1999, 1 pg.
Todd, AC-3: flexible perceptual coding for audio transmission and storage, Feb. 26-Mar. 1, 1994, 16 pgs.
Tudor, MPEG-2 Video Compression, Dec. 1995, 15 pgs.
TVHEAD, Inc., First Examination Report, IN 1744/MUMNP/2007, Dec. 30, 2013, 6 pgs.
TVHEAD, Inc., International Search Report, PCT/US2006/010080, Jun. 20, 2006, 3 pgs.
TVHEAD, Inc., International Search Report, PCT/US2006/024194, Dec. 15, 2006, 4 pgs.
TVHEAD, Inc., International Search Report, PCT/US2006/024195, Nov. 29, 2006, 9 pgs.
TVHEAD, Inc., International Search Report, PCT/US2006/024196, Dec. 11, 2006, 4 pgs.
TVHEAD, Inc., International Search Report, PCT/US2006/024197, Nov. 28, 2006, 9 pgs.
Vernon, Dolby digital: audio coding for digital television and storage applications, Aug. 1999, 18 pgs.
Wang, A beat-pattern based error concealment scheme for music delivery with burst packet loss, Aug. 22-25, 2001, 4 pgs.
Wang, A compressed domain beat detector using MP3 audio bitstream, Sep. 30-Oct. 5, 2001, 9 pgs.
Wang, A multichannel audio coding algorithm for inter-channel redundancy removal, May 12-15, 2001, 6 pgs.
Wang, An excitation level based psychoacoustic model for audio compression, Oct. 30-Nov. 4, 1999, 4 pgs.
Wang, Energy compaction property of the MDCT in comparison with other transforms, Sep. 22-25, 2000, 23 pgs.
Wang, Exploiting excess masking for audio compression, Sep. 2-5, 1999, 4 pgs.
Wang, schemes for re-compressing mp3 audio bitstreams, Nov. 30-Dec. 3, 2001, 5 pgs.
Wang, Selected advances in audio compression and compressed domain processing, Aug. 2001, 68 pgs.
Wang, The impact of the relationship between MDCT and DFT on audio compression, Dec. 13-15, 2000, 9 pgs.
ActiveVideo, http://www.activevideo.com/, as printed out in year 2012, 1 pg.
ActiveVideo Networks Inc., International Preliminary Report on Patentability, PCT/US2013/020769, Jul. 24, 2014, 6 pgs.
ActiveVideo Networks Inc., International Search Report and Written Opinion, PCT/US2014/030773, Jul. 25, 2014, 8 pgs.
ActiveVideo Networks Inc., International Search Report and Written Opinion, PCT/US2014/041416, Aug. 27, 2014, 8 pgs.
ActiveVideo Networks Inc., Communication Pursuant to Rules 70(2) and 70a(2), EP10841764.3, Jun. 22, 2011, 1 pg.
ActiveVideo Networks Inc., Communication Pursuant to Article 94(3) EPC, EP08713106.6, Jun. 26, 2014, 5 pgS.
ActiveVideo Networks Inc., Communication Pursuant to Article 94(3) EPC, EP09713486.0, Apr. 14, 2014, 6 pgS.
ActiveVideo Networks Inc., Examination Report No. 1, AU2011258972, Apr. 4, 2013, 5 pgs.
ActiveVideo Networks Inc., Examination Report No. 1, AU2010339376, Apr. 30, 2014, 4 pgs.
ActiveVideo Networks Inc., Examination Report, App. No. EP11749946.7, Oct. 8, 2013, 6 pgs.
ActiveVideo Networks Inc., Summons to attend oral-proceeding, Application No. EP09820936-4, Aug. 19, 2014, 4 pgs.
ActiveVideo Networks Inc., International Searching Authority, International Search Report-International application No. PCT/US2010/027724, dated Oct. 28, 2010, together with the Written Opinion of the International Searching Authority, 7 pages.
Adams, Jerry, NTZ Nachrichtechnische Zeitschrift. vol. 40, No. 7, Jul. 1987, Berlin DE pp. 534-536; Jerry Adams: 'Glasfasernetz für Breitbanddienste in London', 5 pgs. No English Translation Found.
Avinity Systems B.V., Communication pursuant to Article 94(3) EPC, EP 07834561.8, Jan. 31, 2014, 10 pgs.
Avinity Systems B.V., Communication pursuant to Article 94(3) EPC, EP 07834561.8, Apr. 8, 2010, 5 pgs.
Avinity Systems B.V., International Preliminary Report on Patentability, PCT/NL2007/000245, Feb. 19, 2009, 7 pgs.

(56) References Cited

OTHER PUBLICATIONS

Avinity Systems B.V., International Search Report and Written Opinion, PCT/NL2007/000245, Feb. 19, 2009, 18 pgs.
Avinity Systems B.V., Notice of Grounds of Rejection for Patent, JP 2009-530298, Sep. 3, 2013, 4 pgs.
Avinity Systems B.V., Notice of Grounds of Rejection for Patent, JP 2009-530298, Sep. 25, 2012, 6 pgs.
Bird et al., "Customer Access to Broadband Services," ISSLS 86—The International Symposium on Subrscriber Loops and Services Sep. 29, 1986, Tokyo, JP 6 pgs.
Brockmann, Final Office Action, U.S. Appl. No. 13/668,004, Jul. 16, 2014, 20 pgs.
Brockmann, Office Action, U.S. Appl. No. 13/686,548, Mar. 10, 2014, 11 pgs.
Brockmann, Office Action, U.S. Appl. No. 13/668,004, Dec. 23, 2013, 9 pgs.
Brockmann, Office Action, U.S. Appl. No. 13/438,617, May 12, 2014, 17 pgs.
Brockmann, Final Office Action, U.S. Appl. No. 12/443,571, Mar. 7, 2014, 21 pgs.
Brockmann, Office Action, U.S. Appl. No. 12/443,571, Jun. 5, 2013, 18 pgs.
Chang, Shih-Fu, et al., "Manipulation and Compositing of MC-DOT Compressed Video," IEEE Journal on Selected Areas of Communications, Jan. 1995, vol. 13, No. 1, 11 pgs. BEST COPY AVAILABLE.
Dahlby, Office Action, U.S. Appl. No. 12/651,203, Jun. 5, 2014, 18 pgs.
Dahlby, Final Office Action, U.S. Appl. No. 12/651,203, Feb. 4, 2013, 18 pgs.
Dahlby, Office Action, U.S. Appl. No. 12/651,203, Aug. 16, 2012, 18 pgs.
Dukes, Stephen D., "Photonics for cable television system design, Migrating to regional hubs and passive networks," Communications Engineering and Design, May 1992, 4 pgs.
Ellis, et al., "INDAX: An Operation Interactive Cabletext System", IEEE Journal on Selected Areas in Communications, vol. sac-1, No. 2, Feb. 1983, pp. 285-294.
European Patent Office, Supplementary European Search Report, Application No. EP 09 70 8211, dated Jan. 5, 2011, 6 pgs.
Frezza, W., "The Broadband Solution-Metropolitan CATV Networks," Proceedings of Videotex '84, Apr. 1984, 15 pgs.
Gecsei, J., "Topology of Videotex Networks," The Architecture of Videotex Systems, Chapter 6, 1983 by Prentice-Hall, Inc.
Gobl, et al., "ARIDEM—a multi-service broadband access demonstrator," Ericsson Review No. 3, 1996, 7 pgs.
Gordon, Notice of Allowance, U.S. Appl. No. 12/008,697, Mar. 20, 2014, 10 pgs.
Gordon, Final Office Action, U.S. Appl. No. 12/008,722, Mar. 30, 2012, 16 pgs.
Gordon, Final Office Action, U.S. Appl. No. 12/035,236, Jun. 11, 2014, 14 pgs.
Gordon, Final Office Action, U.S. Appl. No. 12/035,236, Jul. 22, 2013, 7 pgs.
Gordon, Final Office Action, U.S. Appl. No. 12/035,236, Sep. 20, 2011, 8 pgs.
Gordon, Final Office Action, U.S. Appl. No. 12/035,236, Sep. 21, 2012, 9 pgs.
Gordon, Final Office Action, U.S. Appl. No. 12/008,697, Mar. 6, 2012, 48 pgs.
Gordon, Office Action, U.S. Appl. No. 12/035,236, Mar. 13, 2013, 9 pgs.
Gordon, Office Action, U.S. Appl. No. 12/035,236, Mar. 22, 2011, 8 pgs.
Gordon, Office Action, U.S. Appl. No. 12/035,236, Mar. 28, 2012, 8 pgs.
Gordon, Office Action, U.S. Appl. No. 12/035,236, Dec. 16, 2013, 11 pgs.
Gordon, Office Action, U.S. Appl. No. 12/008,697, Aug. 1, 2013, 43 pgs.
Gordon, Office Action, U.S. Appl. No. 12/008,697, Aug. 4, 2011, 39 pgs.
Gordon, Office Action, U.S. Appl. No. 12/008,722, Oct. 11, 2011, 16 pgs.
Handley et al, "TCP Congestion Window Validation," RFC 2861, Jun. 2000, Network Working Group, 22 pgs.
Henry et al. "Multidimensional Icons" ACM Transactions on Graphics, vol. 9, No. 1 Jan. 1990, 5 pgs.
Insight advertisement, "In two years this is going to be the most watched program on TV" On touch VCR programming, published not later than 2000, 10 pgs.
Isensee et al., "Focus Highlight for World Wide Web Frames," Nov. 1, 1997, IBM Technical Disclosure Bulletin, vol. 40, No. 11, pp. 89-90.
Kato, Y., et al., "A Coding Control algorithm for Motion Picture Coding Accomplishing Optimal Assignment of Coding Distortion to Time and Space Domains," Electronics and Communications in Japan, Part 1, vol. 72, No. 9, 1989, 11 pgs.
Koenen, Rob, "MPEG-4 Overview—Overview of the MPEG-4 Standard" Internet Citation, Mar. 2001 (2001-03), http://mpeq.telecomitalialab.com/standards/mpeg-4/mpeg-4.htm, May 9, 2002, 74 pgs.
Konaka, M. et al., "Development of Sleeper Cabin Cold Storage Type Cooling System," SAE International, The Engineering Society for Advancing Mobility Land Sea Air and Space, SAE 2000 World Congress, Detroit, Michigan, Mar. 6-9, 2000, 7 pgs.
Le Gall, Didier, "MPEG: A Video Compression Standard for Multimedia Applications", Communication of the ACM, vol. 34, No. 4, Apr. 1991, New York, NY, 13 pgs.
Langenberg, E, et al., "Integrating Entertainment and Voice on the Cable Network," SCTE , Conference on Emerging Technologies, Jan. 6-7, 1993, New Orleans, Louisiana, 9 pgs.
Large, D., "Tapped Fiber vs. Fiber-Reinforced Coaxial CATV Systems", IEEE LCS Magazine, Feb. 1990, 7 pgs. BEST COPY AVAILABLE.
Mesiya, M.F, "A Passive Optical/Coax Hybrid Network Architecture for Delivery of CATV, Telephony and Data Services," 1993 NCTA Technical Papers, 7 pgs.
"MSDL Specification Version 1.1" International Organisation for Standardisation Organisation Internationale EE Normalisation, ISO/IEC JTC1/SC29/WG11 Coding of Moving Pictures and Autdio, N1246, MPEG96/Mar. 1996, 101 pgs.
Noguchi, Yoshihiro, et al., "MPEG Video Compositing in the Compressed Domain," IEEE International Symposium on Circuits and Systems, vol. 2, May 1, 1996, 4 pgs.
Regis, Notice of Allowance U.S. Appl. No. 13/273,803, Sep. 2, 2014, 8 pgs.
Regis, Notice of Allowance U.S. Appl. No. 13/273,803, May 14, 2014, 8 pgs.
Regis, Final Office Action U.S. Appl. No. 13/273,803, Oct. 11, 2013, 23 pgs.
Regis, Office Action U.S. Appl. No. 13/273,803, Mar. 27, 2013, 32 pgs.
Richardson, Ian E.G., "H.264 and MPEG-4 Video Compression, Video Coding for Next-Genertion Multimedia," Johm Wiley & Sons, US, 2003, ISBN: 0-470-84837-5, pp. 103-105, 149-152, and 164.
Rose, K., "Design of a Switched Broad-Band Communications Network for Interactive Services," IEEE Transactions on Communications, vol. com-23, No. 1, Jan. 1975, 7 pgs.
Saadawi, Tarek N., "Distributed Switching for Data Transmission over Two-Way CATV", IEEE Journal on Selected Areas in Communications, vol. SAC-3, No. 2, Mar. 1985, 7 pgs.
Schrock, "Proposal for a Hub Controlled Cable Television System Using Optical Fiber," IEEE Transactions on Cable Television, vol. CATV-4, No. 2, Apr. 1979, 8 pgs.
Sigmon, Notice of Allowance, U.S. Appl. No. 13/311,203, Sep. 22, 2014, 5 pgs.
Sigmon, Notice of Allowance, U.S. Appl. No. 13/311,203, Feb. 27, 2014, 14 pgs.
Sigmon, Final Office Action, U.S. Appl. No. 13/311,203, Sep. 13, 2013, 20 pgs.
Sigmon, Office Action, U.S. Appl. No. 13/311,203, May 10, 2013, 21 pgs.

(56) References Cited

OTHER PUBLICATIONS

Smith, Brian C., et al., "Algorithms for Manipulating Compressed Images," IEEE Computer Graphics and Applications, vol. 13, No. 5, Sep. 1, 1993, 9 pgs.
Smith, J. et al., "Transcoding Internet Content for Heterogeneous Client Devices" Circuits and Systems, 1998. ISCAS '98. Proceedings of the 1998 IEEE International Symposium on Monterey, CA, USA May 31-Jun. 3, 1998, New York, NY, USA,IEEE, US, May 31, 1998, 4 pgs.
Stoll, G. et al., "GMF4iTV: Neue Wege zur-Interaktivitaet Mit Bewegten Objekten Beim Digitalen Fernsehen," Fkt Fernseh Und Kinotechnik, Fachverlag Schiele & Schon GmbH, Berlin, DE, vol. 60, No. 4, Jan. 1, 2006, ISSN: 1430-9947, 9 pgs. No English Translation Found.
Tamitani et al., "An Encoder/Decoder Chip Set for the MPEG Video Standard," 1992 IEEE International Conference on Acoustics, vol. 5, Mar. 1992, San Francisco, CA, 4 pgs.
Terry, Jack, "Alternative Technologies and Delivery Systems for Broadband ISDN Access", IEEE Communications Magazine, Aug. 1992, 7 pgs.
Thompson, Jack, "DTMF-TV, The Most Economical Approach to Interactive TV," GNOSTECH Incorporated, NCF'95 Session T-38-C, 8 pgs.
Thompson, John W. Jr., "The Awakening 3.0: PCs, TSBs, or DTMF-TV—Which Telecomputer Architecture is Right for the Next Generations's Public Network?," Gnostech Incorporated, 1995 The National Academy of Sciences, downloaded from the Unpredictable Certainty: White Papers, http://www.nap.edu/catalog/6062.html, pp. 546-552.
Tobagi, Fouad A., "Multiaccess Protocols in Packet Communication Systems," IEEE Transactions on Communications, vol. Com-28, No. 4, Apr. 1980, 21 pgs.
Toms, N., "An Integrated Network Using Fiber Optics (Info) for the Distribution of Video, Data, and Telephone in Rural Areas," IEEE Transactions on Communication, vol. Com-26, No. 7, Jul. 1978, 9 pgs.
Trott, A., et al. "An Enhanced Cost Effective Line Shuffle Scrambling System with Secure Conditional Access Authorization," 1993 NCTA Technical Papers, 11 pgs.
Jurgen_Two-way applications for cable television systems in the '70s, IEEE Spectrum, Nov. 1971, 16 pgs.
va Beek, P., "Delay-Constrained Rate Adaptation for Robust Video Transmission over Home Networks," Image Processing, 2005, ICIP 2005, IEEE International Conference, Sep. 2005, vol. 2, No. 11, 4 pgs.
Van der Star, Jack A. M., "Video on Demand Without Compression: A Review of the Business Model, Regulations and Future Implication," Proceedings of PTC'93, 15th Annual Conference, 12 pgs.
Welzenbach et al., "The Application of Optical Systems for Cable TV," AEG-Telefunken, Backnang, Federal Republic of Germany, ISSLS Sep. 15-19, 1980, Proceedings IEEE Cat. No. 80 CH1565-1, 7 pgs.
Yum, TS P., "Hierarchical Distribution of Video with Dynamic Port Allocation," IEEE Transactions on Communications, vol. 39, No. 8, Aug. 1, 1991, XP000264287, 7 pgs.
ActiveVideo Networks Inc. Extended EP Search Rpt, Application No. 09820936-4, Oct. 26, 2012, 11 pgs.
ActiveVideo Networks Inc. Extended EP Search Rpt, Application No. 10754084-1, Jul. 24, 2012, 11 pgs.
ActiveVideo Networks Inc. Extended EP Search Rpt, Application No. 10841764.3, May 20, 2014, 16 pgs.
ActiveVideo Networks Inc. Extended EP Search Rpt, Application No. 11833486.1, Apr. 3, 2014, 6 pgs.
ActiveVideo Networks Inc., Extended EP Search Rpt, Application No. 13168509.1, Apr. 24, 2014, 10 pgs.
ActiveVideo Networks Inc., Extended EP Search Rpt, Application No. 13168376-5, Jan. 23, 2014, 8 pgs.
ActiveVideo Networks Inc., Extended EP Search Rpt, Application No. 12767642-7, Aug. 20, 2014, 12 pgs.
Avinity Systems B.V., Extended European Search Report, Application No. 12163713.6, Feb. 7, 2014, 10 pgs.
Avinity Systems B.V., Extended European Search Report, Application No. 12163712-8, Feb. 3, 2014, 10 pgs.
ActiveVideo Networks, Inc., International Preliminary Report on Patentablity, PCT/US2013/036182, Oct. 14, 2014, 9 pgs.
ActiveVideo Networks Inc., Communication Pursuant to Rule 94(3), EP08713106-6, Jun. 25, 2014, 5 pgs.
ActiveVideo Networks Inc., Communication Pursuant to Rule 94(3), EP09713486.0, Apr. 14, 2014, 6 pgs.
ActiveVideo Networks Inc., Communication Pursuant to Rules 161(2) & 162 EPC, EP13775121.0, Jan. 20, 2015, 3 pgs.
ActiveVideo Networks Inc., Certificate of Patent JP5675765, Jan. 9, 2015, 3 pgs.
ActiveVideo Networks Inc., Decision to Refuse Application, EP09820936.4, Feb. 20, 2015, 4 pgs.
ActiveVideo Networks Inc., Communication Pursuant to Article 94(3) EPC, 10754084.1, Feb. 10, 2015, 12 pgs.
ActiveVideo Networks Inc., Intention to Grant, Communication under Rule 71(3) EPC, EP08713106.6, Feb. 19, 2015, 12 pgs.
ActiveVideo Networks Inc., Notice of Reasons for Rejection, JP2014-100460, Jan. 15, 2015, 6 pgs.
ActiveVideo Networks Inc., Notice of Reasons for Rejection, JP2013-509016, Dec. 24, 2014 (Received Jan. 14, 2015), 11 pgs.
Brockmann, Notice of Allowance, U.S. Appl. No. 13/445,104, Dec. 24, 2014, 14 pgs.
Brockmann, Office Action, U.S. Appl. No. 13/668,004, Feb. 26, 2015, 17 pgs.
Brockmann, Office Action, U.S. Appl. No. 13/686,548, Jan. 5, 2015, 12 pgs.
Brockmann, Office Action, U.S. Appl. No. 13/911,948, Dec. 26, 2014, 12 pgs.
Brockmann, Office Action, U.S. Appl. No. 13/911,948, Jan. 29, 2015, 11 pgs.
Dahlby, Office Action, U.S. Appl. No. 12/651,203, Dec. 3, 2014, 19 pgs.
Craig, Decision on Appeal—Reversed—, U.S. Appl. No. 11/178,177, Feb. 25, 2015, 7 pgs.
Craig, Notice of Allowance, U.S. Appl. No. 11/178,177, Mar. 5, 2015, 7 pgs.
Craig, Notice of Allowance, U.S. Appl. No. 11/178,181, Feb. 13, 2015, 8 pgs.
Gordon, Notice of Allowance, U.S. Appl. No. 12/008,697, Dec. 8, 2014, 10 pgs.
Regis, Notice of Allowance, U.S. Appl. No. 13/273,803, Nov. 18, 2014, 9 pgs.
Regis, Notice of Allowance, U.S. Appl. No. 13/273,803, Mar. 2, 2015, 8 pgs.
Sigmon, Notice of Allowance, U.S. Appl. No. 13/311,203, Dec. 19, 2014, 5 pgs.
TAG Networks Inc, Decision to Grant a Patent, JP 2008-506474, Oct. 4, 2013, 5 pgs.
Brockmann, Notice of Allowance, U.S. Appl. No. 13/438,617, May 22, 2015, 18 pgs.
Brockmann, Notice of Allowance, U.S. Appl. No. 13/445,104, Apr. 23, 2015, 8 pgs.
Brockmann, Office Action, U.S. Appl. No. 14/262,674, May 21, 2015, 7 pgs.
Gordon, Notice of Allowance, U.S. Appl. No. 12/008,697, Apr. 1, 2015, 10 pgs.
Sigmon, Notice of Allowance, U.S. Appl. No. 13/311,203, Apr. 14, 2015, 5 pgs.
Avinity-Systems-BV, PreTrial-Reexam-Report-JP2009530298, Apr. 24, 2015, 6 pgs.
ActiveVideo Networks Inc., Communication Pursuant to Rules 70(2) and 70a(2), EP11833486.1, Apr. 24, 2014, 1 pg.
ActiveVideo Networks, Inc., International Search Report and Written Opinion, PCT/US2014/041430, Oct. 9, 2014, 9 pgs.
ActiveVideo Networks Inc., Examination Report No. 1, AU2011258972, Jul. 21, 2014, 3 pgs.
Active Video Networks, Notice of Reasons for Rejection, JP2012-547318, Sep. 26, 2014, 7 pgs.

(56) References Cited

OTHER PUBLICATIONS

Avinity Systems B. V., Final Office Action, JP-2009-530298, Oct. 7, 2014, 8 pgs.
Brockmann, Final Office Action, U.S. Appl. No. 13/686,548, Sep. 24, 2014, 13 pgs.
Brockmann, Final Office Action, U.S. Appl. No. 13/438,617, Oct. 3, 2014, 19 pgs.
Brockmann, Office Action, U.S. Appl. No. 12/443,571, Nov. 5, 2014, 26 pgs.
ActiveVideo Networks, Inc., Certificate of Grant, AU2011258972, Nov. 19, 2015, 2 pgs.
ActiveVideo Networks, Inc., Certificate of Grant, AU2011315950, Dec. 17, 2015, 2 pgs.
ActiveVideo Networks, Inc., Certificate of Grant EP13168509. 11908, Sep. 30, 2015, 2 pgs.
ActiveVideo, Certificate of Grant, AU2011249132, Jan. 7, 2016, 2 pgs.
ActiveVideo, Notice of German Patent, EP602008040474-9, Jan. 6, 2016, 4 pgs.
ActiveVideo Networks, Inc., Communication Pursuant to Rules 161(1) and 162 EPC, EP14722897.7, Oct. 28, 2015, 2 pgs.
ActiveVideo Networks, Inc., Decision to Grant, EP13168509.1-1908, Sep. 3, 2015, 2 pgs.
ActiveVideo Networks, Inc., Decision to Refuse a European Patent Application, EP08705578.6, Nov. 26, 2015, 10 pgs.
ActiveVideo Networks, Inc., Extended European Search Report, EP13735906.3, Nov. 11, 2015, 10 pgs.
ActiveVideo Networks, Inc., International Preliminary Report on Patentability, PCT-US2014030773, Sep. 15, 2015, 6 pgs.
ActiveVideo Networks, Inc., International Preliminary Report on Patentability, PCT/US2014041430, Dec. 8, 2015, 6 pgs.
ActiveVideo Networks, Inc., International Preliminary Report on Patentability, PCT-US2014041416, Dec. 8, 2015, 6 pgs.
AcriveVideo, Communication Pursuant to Article 94(3) EPC, EP10841764.3, Dec. 18, 2015, 6 pgs.
ActiveVideo Networks, Inc., Communication Pursuant to Rules 70(2) abd 70a(2) EP13735906.3, Nov. 27, 2015, 1 pg.
ActiveVideo, Notice of Reasons for Rejection, JP2013-509016, Dec. 3, 2015, 7 pgs.
Brockmann, Notice of Allowance, U.S. Appl. No. 14/262,674, Sep. 30, 2015, 7 pgs.
Brockmann, Office Action, U.S. Appl. No. 12/443,571, Dec. 4, 2015, 30 pgs.
Dahlby, Final Office Action, U.S. Appl. No. 12/651,203, Dec. 11, 2015, 25 pgs.
Jacob, Bruce, "Memory Systems: Cache, DRAM, Disk," Oct. 19, 2007, The Cache Layer, Chapter 22, p. 739.
ActiveVideo Networks, Inc., Certificate of Grant, EP08713106.6-1908, Aug. 5, 2015, 2 pgs.
ActiveVideo Networks, Inc., Decision to Grant, EP08713106.6-1908, Jul. 9, 2015, 2 pgs.
ActiveVideo Networks, Inc., Decision to Grant, JP2014100460, Jul. 24, 2015, 5 pgs.
ActiveVideo Networks Inc., Examination Report No. 2, AU2011249132, May 29, 2015, 4 pgs.
Activevideo Networks Inc., Examination Report No. 2, AU2011315950, Jun. 25, 2015, 3 pgs.
ActiveVideo, International Search Report and Written Opinion, PCT/US2015/027803, Jun. 24, 2015, 18 pgs.
ActiveVideo, International Search Report and Written Opinion, PCT/US2015/027804, Jun. 25, 2015, 10 pgs.
ActiveVideo Networks, Inc., International Search Report and Written Opinion, PCT-US2015028072, Aug. 7, 2015, 9 pgs.
ActiveVideo Networks B.V., Office Action, IL222830, Jun. 28, 2015, 7 pgs.
ActiveVideo Networks, Inc., Office Action, JP2013534034, Jun. 16, 2015, 6 pgs.
ActiveVideo Networks, Inc., KIPO'S Notice of Preliminary Rejection, KR10-2010-7019512, Jul. 15, 2015, 15 pgs.
ActiveVideo Networks, Inc., KIPO'S Notice of Preliminary Rejection, KR10-2010-7021116, Jul. 13, 2015, 19 pgs.
ActiveVideo, Communication Pursuant to Article-94(3) EPC, EP12767642.7, Sep. 4, 2015, 4 pgs.
Brockmann, Notice of Allowance, U.S. Appl. No. 13/911,948, Jul. 10, 2015, 5 pgs.
Brockmann, Final Office Action, U.S. Appl. No. 12/443,571, Jul. 9, 2015, 28 pgs.
Brockmann, Notice of Allowance, U.S. Appl. No. 13/911,948, Aug. 21, 2015, 6 pgs.
Brockmann, Notice of Allowance, U.S. Appl. No. 13/911,948, Aug. 5, 2015, 5 pgs.
Brockmann, Final Office Action, U.S. Appl. No. 13/668,004, Aug. 3, 2015, 18 pgs.
Brockmann, Final Office Action, U.S. Appl. No. 13/686,548, Aug. 12, 2015, 13 pgs.
Brockmann, Final Office Action, U.S. Appl. No. 13/737,097, Aug. 14, 2015, 17 pgs.
Brockmann, Office Action, U.S. Appl. No. 14/298,796, Sep. 11, 2015, 11 pgs.
Dahlby, Office Action U.S. Appl. No. 12/651,203, Jul. 2, 2015, 25 pgs.
Gecsei, J., "Adaptation in Distributed Multimedia Systems," IEEE Multimedia, IEEE Service Center, New York, NY, vol. 4, No. 2, Apr. 1, 1997, 10 pgs.
Ohta, K., et al., "Selective Multimedia Access Protocol for Wireless Multimedia Communication," Communications, Computers and Signal Processing, 1997, IEEE Pacific Rim Conference NCE Victoria, BC, Canada, Aug. 1997, vol. 1, 4 pgs.
Wei, S., "QoS Tradeoffs Using an Application-Oriented Transport Protocol (AOTP) for Multimedia Applications Over IP." Sep. 23, 1999, Proceedings of the Third International Conference on Computational Intelligence and Multimedia Applications, New Delhi, India, 5 pgs.
ActiveVideo Networks, Inc., Certificate of Patent, JP2013534034, Jan. 8, 2016, 4 pgs.
ActiveVideo Networks, Inc., Communication Pursuant to Rules 161(1) and 162 EPC, EP14740004.8, Jan. 26, 2016, 2 pgs.
ActiveVideo Networks, Inc., Communication Pursuant to Rules 161(1) and 162 EPC, EP14736535.7, Jan. 26, 2016, 2 pgs.
Brockmann, Office Action, U.S. Appl. No. 13/686,548, Feb. 8, 2016, 13 pgs.

* cited by examiner

MPEG OBJECTS AND SYSTEMS AND METHODS FOR USING MPEG OBJECTS

CROSS-REFERENCE TO RELATED APPLICATIONS

U.S. Patent Application entitled "Interactive Encoded Content System including Object Models for Viewing on a Remote Device" and assigned to the same assignee filed contemporaneously herewith on Jan. 11, 2008 is related generally to the subject matter of the present application and is incorporated herein by reference in its entirety.

The present application claims priority from U.S. provisional application Ser. No. 60/884,744, filed Jan. 12, 2007, Ser. No. 60/884,773, filed Jan. 12, 2007, and Ser. No. 60/884,772, filed Jan. 12, 2007, the full disclosures of which are hereby incorporated herein by reference.

TECHNICAL FIELD AND BACKGROUND ART

The present invention relates to interactive encoded video and more specifically to interactive MPEG video that can be used with a client device having a decoder and limited caching capabilities.

Set-top boxes of cable television systems have preferably been simple devices. The boxes generally include a QAM decoder, an MPEG decoder, and a transceiver for receiving signals from a remote control and transferring the signals to the cable headend. In order to keep costs down, set-top boxes have not included sophisticated processors, such as those found in personal computers or extensive memory for caching content or programs. As a result, developers attempting to provide interactive content that includes encoded video elements such as those found in dynamic web pages to subscribers have been forced to find solutions that are compatible with the set-top boxes. These solutions require having the processing functionality reside at the cable headend and further require that the content is delivered in MPEG format. In order to provide dynamic web page content, the content forming the web page first must be decoded and then rendered within the webpage frame as a bitmap. Next, the rendered frames are then re-encoded into an MPEG stream that the set-top box of a requesting user can decode. This decoding and re-encoding scheme is processor intensive.

SUMMARY OF THE INVENTION

In a first embodiment, a system for providing interactive MPEG content for display on a display device associated with a client device having an MPEG decoder is disclosed. The system operates in a client/server environment wherein the server includes a plurality of session processors that can be assigned to an interactive session requested by a client device. The session processor runs a virtual machine, such as a JAVA virtual machine. The virtual machine includes code that in response to a request for an application accesses the requested application. In addition the virtual machine is capable of parsing the application and interpreting scripts. The application contains a layout for an MPEG frame composed of a plurality of MPEG elements. The application also includes a script that refers to one or more MPEG objects that provide the interactive functionality and the MPEG elements (MPEG encoded audio/video) or methodology for accessing the encoded MPEG audio/video content if the content is stored external to the MPEG object.

The MPEG object includes an object interface that defines data received by the MPEG object and data output by the MPEG object. Additionally, the MPEG object includes one or more MPEG video or audio elements. The MPEG elements are preferably groomed so that the elements can be stitched together to form an MPEG video frame. In some embodiments, the MPEG elements are located external to the MPEG object and the MPEG object includes a method for accessing the MPEG element(s). In certain embodiments, the MPEG object includes a plurality of MPEG video elements wherein each element represents a different state for the MPEG object. For example, a button may have an "on" state and an "off" state and an MPEG button object would include an MPEG element composed of a plurality of macroblocks/slices for each state. The MPEG object also includes methods for receiving input from the client device through the object interface and for outputting data from the MPEG object through the object interface.

After the program running on the virtual machine, has obtained all of the MPEG objects indicated in the application, the program on the virtual machine provides the MPEG elements and the layout to a stitcher. In certain embodiments, the virtual machine and program for retrieving and parsing the application and interpreting the scripts may be subsumed in the stitcher. The stitcher then stitches together each of the MPEG elements in their position within the MPEG frame. The stitched MPEG video frame is passed to a multiplexor that multiplexes in any MPEG audio content and additional data streams and the MPEG video frame is placed into an MPEG transport stream that is directed to the client device. In certain embodiments, the multiplexor may be internal to the stitcher. The client device receives the MPEG frame and can then decode and display the video frame on an associated display device. This process repeats for each video frame that is sent to the client device. As the client interacts and makes requests, for example changing the state of a button object, the virtual machine in conjunction with the MPEG object updates the MPEG element provided to the stitcher and the stitcher will replace the MPEG element within the MPEG video frame based upon the request of the client device. In certain other embodiments, each MPEG element representative of a different state of the MPEG object is provided to the stitcher. The virtual machine forwards the client's request to the stitcher and the stitcher selects the appropriate MPEG element based upon the MPEG objects state from a buffer to stitch into the MPEG video frame.

An interactive MPEG application may be constructed in an authoring environment. The authoring environment includes an editor with one or more scene windows that allow a user to create a scene based upon placement of MPEG objects within a scene window. An object tool bar is included within the authoring environment that allows the MPEG objects to be added. The authoring environment also includes a processor that produces an application file that contains at least reference to the MPEG objects and the display position for each of the MPEG objects within the scene. Preferably, when the MPEG object is placed within a scene window, the MPEG video element for the MPEG object is automatically snapped to a macroblock boundary. For each MPEG object that is added to the scene, the properties for the object can be modified. The authoring environment also allows a programmer to create scripts for using the MPEG objects. For example, a script within the application may relate a button state to an execution of a program. The authoring environment also provides for the creation of new MPEG objects. A designer may create an MPEG object by providing graphical content such as a video file or still image. The authoring environment will encode the graphical content so that the content includes MPEG elements/slices or a sequence of MPEG elements/ slices. In addition to defining the MPEG video resource, the authoring environment allows the designer to add methods, properties, object data and scripts to the MPEG object.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Embodiments of the present invention disclose MPEG objects and systems and methods of using MPEG objects in a client/server environment for providing interactive encoded video content to a client device that includes an MPEG decoder and an upstream data connection to the server in an interactive communications network. As used in the detailed description and the claims the term MPEG element and MPEG video element shall refer to graphical information that has been formatted according to an MPEG standard (Motion Picture Experts Group). The graphical information may only be partially encoded. For example, graphical information that has been transform coded using the discrete cosine transform will be considered to be an MPEG element without requiring quantization, entropy encoding and additional MPEG formatting. MPEG elements may include MPEG header information for macroblocks and the slice level. An MPEG element may include data for either a full MPEG video frame, a portion of an MPEG video frame (macroblocks or slices) that are contiguous or non-contiguous, or data representative of a temporal sequence (frames, macroblocks or slices).

Figure 1:
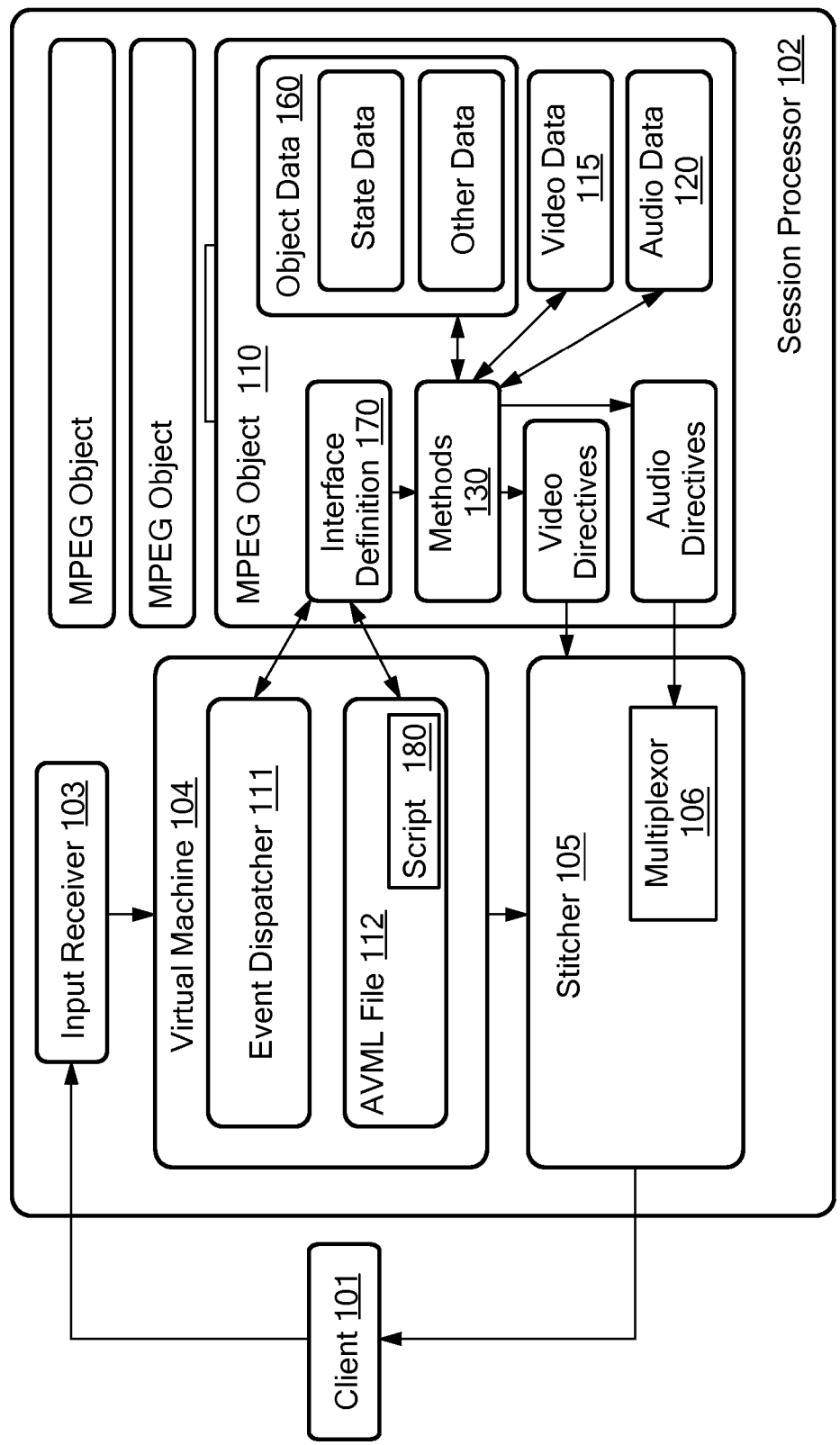
FIG. 1 graphically shows an example of an atomic MPEG object as used in a client/server environment.

Interactive content formed from MPEG objects is preferably used in a client/server environment 100 as shown in FIG. 1 wherein the client device 101 does not need memory for caching data and includes a standard MPEG video decoder. An example of such a client device is a set-top box or other terminal that includes an MPEG decoder. Client devices may include a full processor and memory for caching; however these elements are not necessary for operation of this system. The server device in the client/server environment contains at least a session processor 102 formed from at least one processor that includes associated memory.

The client 101 and server establish an interactive session wherein the client device 101 transmits a request for an interactive session through an interactive communication network. The server assigns a session processor 102 and the request is sent to an input receiver 103 of the assigned session processor 102. The session processor 102 runs a virtual machine 104 that can interpret scripts. The virtual machine 104 may be any one of a number of virtual machines, such as a JAVA virtual machine. In response to the interactive request from the client, addressing information for the session processor is passed to the client 101. The client 101 then selects an interactive application, as defined in an AVML (Active Video Mark-up Language) file to view and interact with. Interactive applications may include references to video content along with selection controls, such as buttons, lists, and menus. Further explanation of such applications is explained in the U.S. patent application entitled, filed concurrently herewith entitled, "Interactive Encoded Content System including Object Models for Viewing on a Remote Device" and assigned to the same assignee, which is incorporated by reference in its entirety. The request for the selected application is directed to the virtual machine 104. The virtual machine 104 accesses the AVML file defining the application that indicates the MPEG objects, along with any other graphical content that is necessary for composing a video frame within a video sequence for display on a display device. The AVML file also includes the location within the frame for positioning each of the MPEG objects. In addition, the AVML file may include one or more scripts. One use for a script is to maintain the state of an MPEG object. These MPEG objects can reside and be accessed at different locations and may be distributed. The graphical elements of the MPEG objects are stitched together by a stitcher 105 based upon the location information within the application file (AVML file) to form complete MPEG video frames. The video frames along with MPEG audio frames are multiplexed together in a multiplexor 106 within the stitcher to form an MPEG stream that is sent to the requesting client device. The MPEG stream may then be decoded and displayed on the client's device. The input receiver, virtual machine, and stitcher may be embodied as either computer code that can be executed/interpreted on the session processor or may embodied in hardware or a combination of hardware and software. In some embodiments, any of the software (i.e. input receiver, virtual machine, or stitcher) may be constructed in hardware that is separate from the session processor. Additionally, the stitcher, which may be a computer program application may incorporate the functionality of the input receiver, the virtual machine and may process and parse the application file (AVML).

In certain embodiments, the stitcher may stitch the graphical elements together based upon the type of device that has requested the application. Devices have different capabilities. For example MPEG decoders on certain devices may not be as robust and capable of implementing all aspects of the chosen MPEG standard. Additionally, the bandwidth of the transmission path between the multiplexor and the client device may vary. For example, in general, wireless devices may have less bandwidth than wireline devices. Thus, the stitcher may insert into the MPEG header parameters a load delay or no delay, allow skips or not allow skips, force all frames to be encoded as I-frames or use a repeated uniform quantization to reduce the number of bits required to represent the values.

An MPEG object is part of a programming paradigm that allows individual MPEG video elements to be stitched together to form a frame of a video stream that incorporates active elements wherein a client can interact with the active elements and more specifically change the video stream. The MPEG video elements associated with an MPEG object may be a plurality of encoded macroblocks or slices that form a graphical element. A client can use a client device to select a graphical element on a display screen and interact with that graphical element. An MPEG object 110 includes an association with MPEG video and/or audio data along with methods and properties for the object. The MPEG video or audio may reside internal to the MPEG object or may be externally accessed through remote function calls. The methods within an MPEG object are code that may receive data from outside of the object, process the received data and/or the MPEG video 115 and audio data 120 and output data from the object according to video and audio directives. Object data 160 may indicate the state of the object or other internal variables for the object. For example, parameters such as display priority may be used to determine the priority of stacked media. In addition, parental control parameters, such as a content rating, may be associated with the audio or video data or an audio or video source or address. A parental control may be a method internal to an MPEG object that provides for control over access to the content.

As shown in FIG. 1 a virtual machine is made active on a session processor 102 in response to a request for an interactive application (AVML file having a script) and accesses a first MPEG object 110 which is an atomic object. An atomic object is self-contained in that the object contains all of the encoded data and methods necessary to construct all of the visual states for the object. Once the object is retrieved by the virtual machine the object requires no additional communications with another source. An example of an atomic object is a button that is displayed within a frame. The button object would have an MPEG video file for all states of the button and would include methods for storing the state based upon a client's interaction. The atomic object includes both pre-encoded MPEG data (video and audio data) 115, 120 along with methods 130. In certain embodiments, the audio or video data may not initially be MPEG elements, but rather graphical or audio data in another format that is converted either by the virtual machine or the stitcher into MPEG elements. In addition to the pre-encoded MPEG data 115, 120, the atomic object can include object data 160, such as state information. The object interacts with external sources through an interface definition 170 along with a script 180 for directing data to and from the object. The interface 170 may be for interacting with C++ code, Java Script or binary machine code. For example, the interface may be embodied in a class definitions.

An event may be received from a client device into the input receiver 103 that passes the event to an event dispatcher 111. The event dispatcher 111 identifies an MPEG object within the AVML file that is capable of processing the event. The event dispatcher then communicates the event to that object.

In response, the MPEG object through the interface definition 170 accesses the MPEG video 115 and/or audio data 120. The MPEG object may implement a method 130 for handling the event. In other embodiments, the interface definitions may directly access the data (object data, audio data and video data) Each MPEG object may include multiple MPEG video files that relate to different states of the object wherein the state is stored as object data 160. For example, the method may include a pointer that points the stitcher to the current frame and that is updated each time the stitcher is provided with a video frame. Similarly, the MPEG audio data 120 may have associated methods within the MPEG object.

For example, the audio methods 130 may synchronize the MPEG audio data 120 with the MPEG video data 115. In other embodiments, state information is contained within the AVML file 11.

Figure 1A:
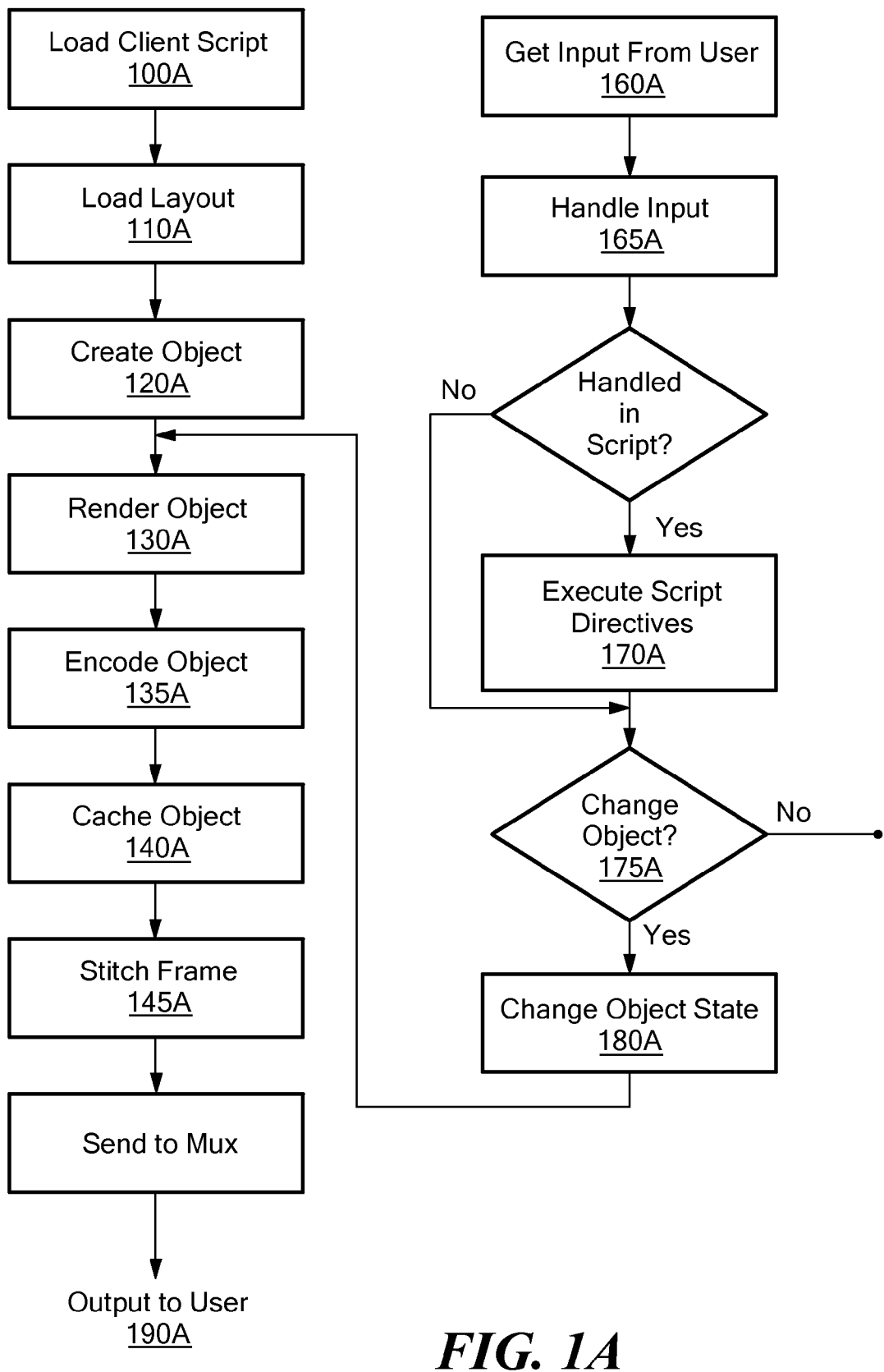
FIG. 1A is a flow chart showing process flow between a stitcher and events from a client device.

The process flow for the MPEG object and system for implementing the MPEG object is shown in the flow chart of FIG. 1A. In FIG. 1A, all code for accessing and parsing of an application is contained within the stitcher. The stitcher may be a software module that operates within the virtual machine on the session processor.

After receiving the request for the application and retrieving the application the stitcher first loads any script that exists within the application. 100A The stitcher accesses the layout for the video frame and loads this information into memory. 110A The layout will include the background, the overall size of the video frame, the aspect ratio, and position of any objects within the application. The stitcher then instantiates any MPEG objects that are present within the application. 120A Based upon a script within the application that keeps track of the state of an object, the graphical element associated with the state for each object is retrieved from a memory location. The graphical element may be in a format other than MPEG and may not initially be an MPEG element. The stitcher will determine the format of the graphical element. If the graphical element is in a non-MPEG element format, such as a TIFF format, GIF or RGB, for example, the stitcher will render the graphical element into a spatial representation. 130A The stitcher will then encode the spatial representation of the graphical element, so that it becomes an MPEG element. 135A Thus, the MPEG element will have macroblock data formed into slices. If the graphical element associated with the MPEG object is already in an MPEG element format then neither rendering or encoding is necessary. The MPEG elements may include one or more macroblocks that have associated position information. The stitcher then converts the relative macroblock/slice information into global MPEG video frame locations based upon the position information from the layout and encodes each of the slices. The slices are then stored to memory so that they are cached for quick retrieval. 140A An MPEG video frame is then created. The MPEG elements for each object based upon the layout are placed into scan order by slice for an MPEG frame. The stitcher sequences the slices into the appropriate order to form an MPEG frame. 145A The MPEG video frame is sent to the stitcher's multiplexor and the multiplexor multiplexes the video frame with any audio content. The MPEG video stream that includes the MPEG video frame and any audio content is directed through the interactive communication network to the client device of the user for display on a display device. 190A Changes to the MPEG frames are event driven. A user through an input device sends a signal through a client device to the session processor that is provided to the stitcher. 160A The stitcher checks to see if the input that is received is input that is handled by the script of the application using the event dispatcher. 165A If it is handled by the script, the script directives are executed/interpreted. 170A The stitcher determines if the object state has changed. 175A The stitcher will retrieve the graphical element associated with the state of that object from a memory location. 180A The stitcher may retrieve the graphical element from a memory location associated with the MPEG object after the event has been processed, or the MPEG object may place the graphical element in a memory location associated with the stitcher during event processing. The stitcher will again determine the format of the graphical element. If the graphical element is in a non-MPEG element format and therefore is not structured according to macroblocks and slices, the stitcher will render and encode the element as an MPEG element and will cache the element into a buffer. 130A, 135A, 140A This new MPEG element representative of the change in state will be stitched into the MPEG frame at the same location as defined by the layout for the MPEG frame from the application. 145A The stitcher will gather all of the MPEG elements and places the slices into scan order and format the frame according to the appropriate MPEG standard. The MPEG frame will then be sent to the client device for display. 190A The system will continue to output MPEG frames into an MPEG stream until the next event causes a change in state and therefore, a change to one or more MPEG elements within the frame layout.

Figure 2:
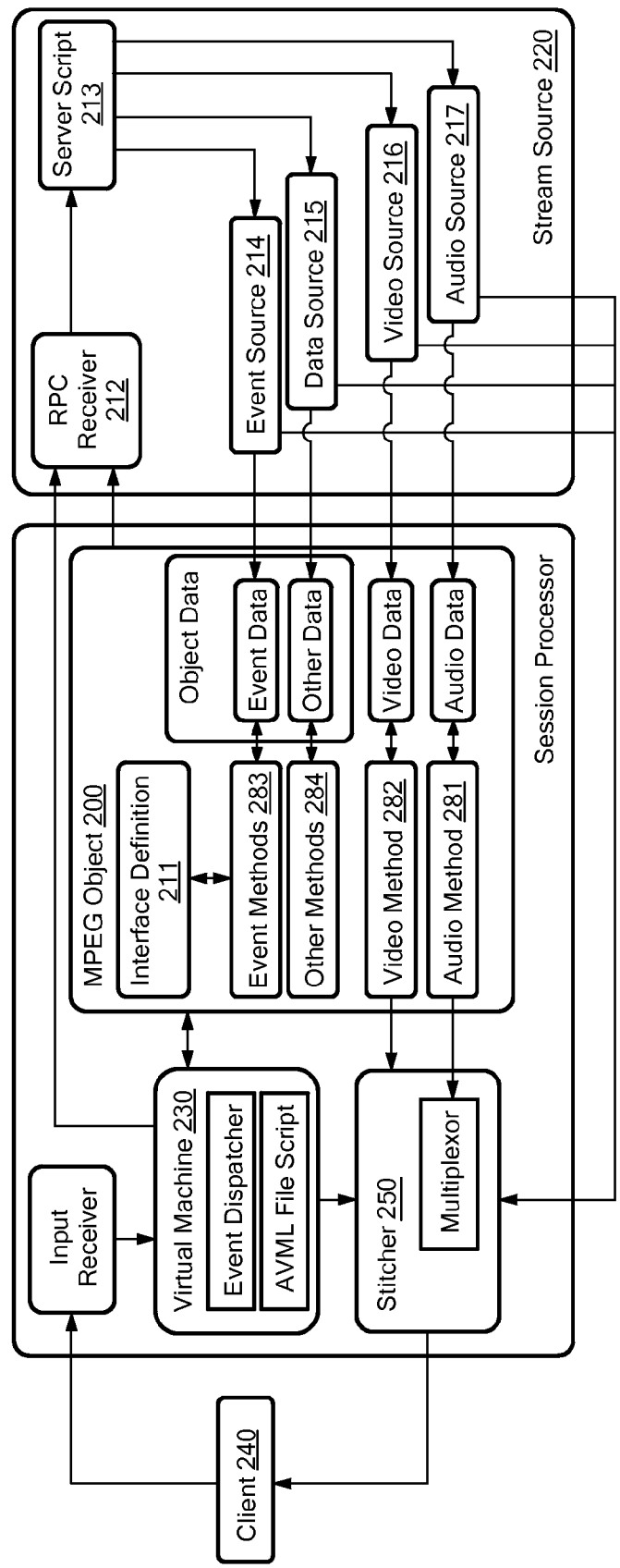
FIG. 2 graphically shows an example of a streaming MPEG object as used in a client/server environment.

A second MPEG object is a streaming MPEG object. The streaming MPEG object operates within the same environment as the atomic object, but the object is not self-contained and accesses an outside source for source data. For example, the object may be a media player that allows for selection between various sources of audio and video. Thus, the MPEG object is not self-contained for each of the audio and video sources, but the MPEG object accesses the sources based upon requests from the client device. As shown in FIG. 2, the MPEG object 200 and methods implemented according to interface definitions (input, output) 211 link the MPEG object 200 to the virtual machine 230, the stitcher 250, as well as an RPC (remote procedure call) receiver 212 at a stream source 220. Thus, the streaming MPEG object is in communication with the virtual machine/client 230, 240 a stitcher 250, a source entity, the stream source 220 and other sources. The interface definitions may also directly access the data (object, audio and video). In response to an event, an event dispatcher accesses the MPEG object capable of handling the event using the interface. The event dispatcher causes the MPEG object to access or request the video and audio content requested by the client. This request may be achieved directly by a method within the MPEG object that accesses the data source. In other embodiments, a script within the AVML file calls an RPC receiver 212 that accesses a server script 213. The server script 213 retrieves the requested content (event source 214, data source 215, video source 216, or audio source 217) or accesses an address for the content and either provides this information or content to the MPEG object or to the stitcher 250.

The server script 213 may render the requested content and encode the content as one or more MPEG slices. MPEG video content can be passed through the MPEG object to the stitcher 250 that stitches together the MPEG video content into an MPEG video frame. The MPEG object may also request or retrieve audio MPEG content that can be passed to the stitcher. Thus, audio MPEG content may be processed in a similar fashion to MPEG video content. The MPEG video data may be processed by a method within the MPEG object. For example, a method may synchronize all of the MPEG content prior to providing the MPEG content to the stitcher, or the method may confirm that all of the MPEG content has been received and is temporally aligned, so that the stitcher can stitch together a complete MPEG video frame from a plurality of MPEG object video and audio data for presentation to the client in a compliant MPEG stream. The script of the AVML file or the MPEG object may request updated content from the stream source through the server script 213 or directly from an addressable location. An event requesting updated content may originate from communication with the client. The content may originate from a data, audio, video, or event source 214-217.

Event data 214 includes but is not limited to trigger data. Triggers include data that can be inserted into the MPEG transport stream. In addition, triggers may be internal to an MPEG video or audio source. For example, triggers may be located in header information or within the data content itself. These triggers when triggered can cause different events, such as an overlay to be presented on the screen of the client or a pop-up advertisement. The data source 215 may include data that is not traditionally audio or video data. For example, a data from the data source may include an alert notification for the client script, data to be embedded within the MPEG video stream or stock data that is to be merged with a separate graphical element.

Each of the various sources that have been requested is provided to the stitcher directly or may pass through the MPEG object. The MPEG object using a method may combine the data sources into a single stream for transport to the session processor. The single stream is received by the session processor and the session processor Like the atomic object the streaming object may include audio and video methods 281, 282 that synchronize the audio and video data. The video method 282 provides the video content to the stitcher so that the stitcher can stitch each of the MPEG video elements together to form a series of MPEG frames. The audio method 281 provides the audio data to the multiplexor within the stitcher so that the audio data is multiplexed together with the video data into an MPEG transport stream. The MPEG object also includes methods 283, 284 for the event data and for the other data.

Figure 2A:
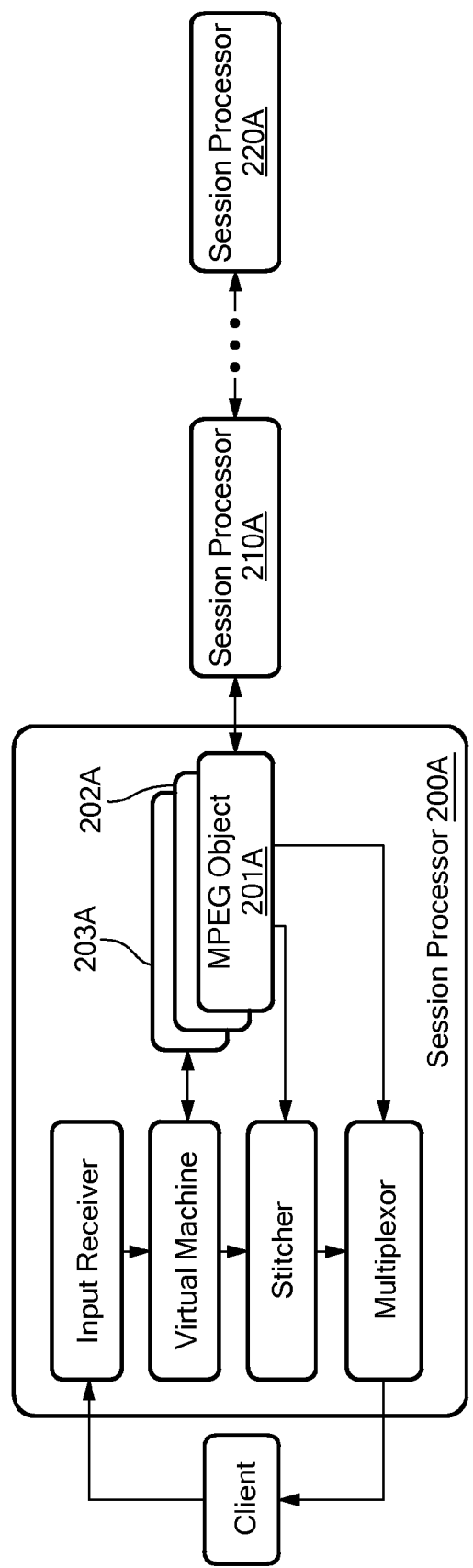
FIG. 2A graphically shows an embodiment employing several session processors.

Steaming MPEG objects may be produced by stitching multiple streaming MPEG objects 201A, 202A . . . 203A together in a session processor 200A. Construction of a scene may occur by linking multiple session processors 210A . . . 220A wherein each session processor feeds the next session processor with the MPEG elements of an MPEG object as shown in FIG. 2A.

The MPEG object, either an atomic object or a streaming object may itself be an application with a hierarchy of internal objects. For example, there may be an application object that defines the type of application at the top level. Below the application object there may be a scene object that defines a user interface including the locations of MPEG elements that are to be stitched together along with reference to other MPEG objects that are necessary for the application. Below the scene object, the individual MPEG object could be located. Thus, an MPEG object may be a self contained application. In such an embodiment, in response to a request for an application, the client script would call the MPEG object that contains the application and the application would be instantiated.

Figure 3:
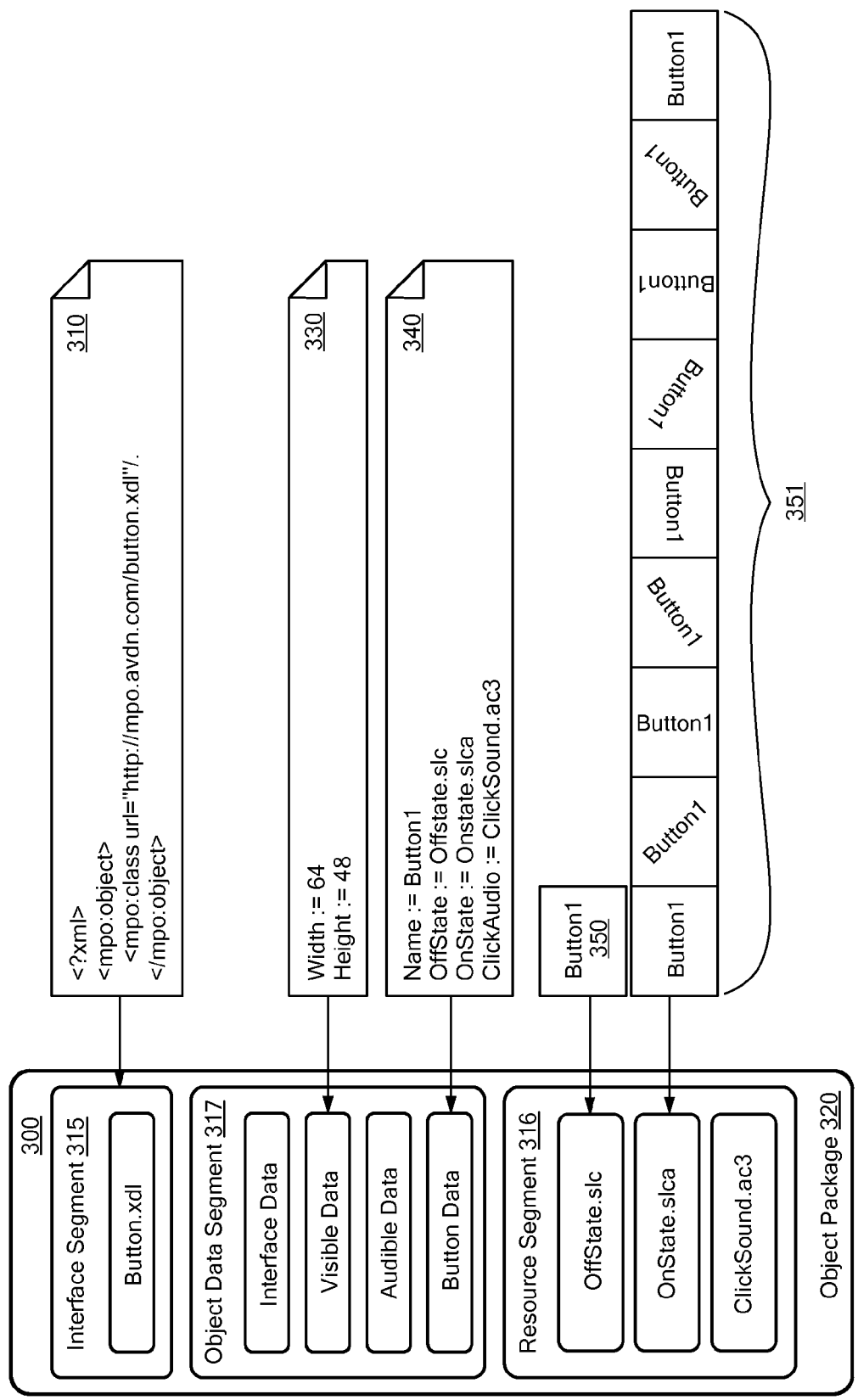
FIG. 3 provides an exemplary data structure and pseudo code for an atomic MPEG button object.

An example of an atomic MPEG object's data structure 300 along with pseudo code 310 for the MPEG object is shown in FIG. 3. Each MPEG object includes an interface segment 315 that may provide such information as class definitions and/or the location of the object and related class definitions in a distributed system. MPEG objects also include either a resource segment 316 or a method for at least receiving one or more resources.

The data structure 300 of FIG. 3 shows the object container/package 320 that includes an interface segment 315 that provides the location of the button MPEG object. The object also includes an object data segment 317. As shown there may be multiple object data segments (i.e. Interface Data, Visible Data, Audible Data, Button Data etc.) The object data is data that is used to define parameters of the object. For example, the visible data 330 for the object defines the height and the width of the button. The button data 340 provides a name for the button along with the states of the button and an audio file that is played when the button is selected (ClickAudio:=ClickSound.ac3). The resource segment 316 of the MPEG button object includes one or more video and/or audio files. In the example that is shown, the various state data for the button are provided 350, 351 wherein the video content would be a collection of macroblocks that represent one or more frames of MPEG video data. Thus, for each state of the button there would be at least one group of MPEG video elements composed of a plurality of macroblocks. The MPEG video elements would be the size of the height and width of the button and may be smaller than a frame to be displayed on a client's display device.

Figure 4:
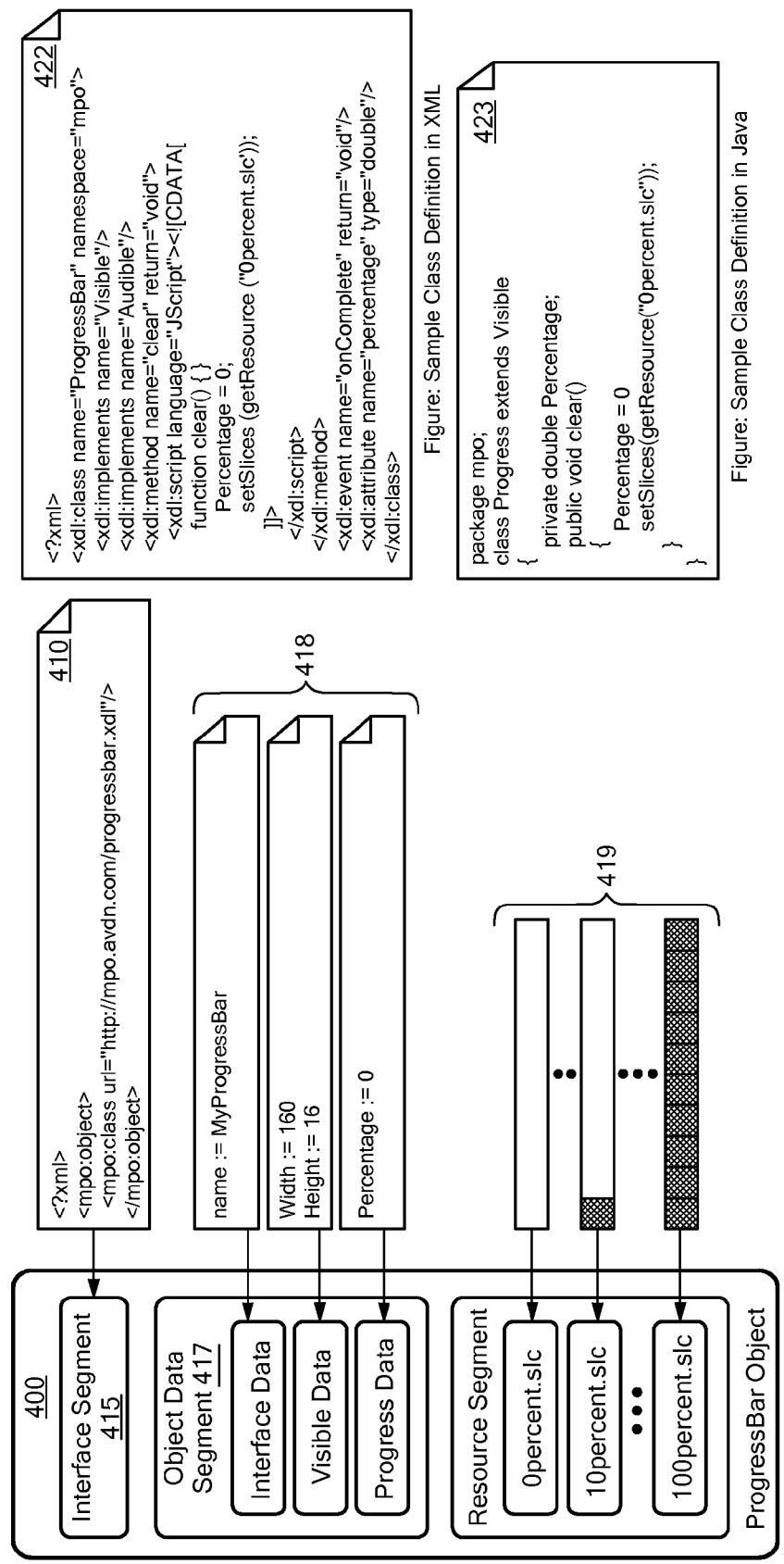
FIG. 4 provides an exemplary data structure and pseudo code for a progress bar MPEG object.

FIG. 4 shows another example of a possible MPEG object including the data structure 400 and pseudo code 410. This example is of a progress bar object. Like the MPEG object of FIG. 3 the progress bar MPEG object includes an interface segment 415 that identifies the location of the object's classes. Sample class definitions are provided in both XML and JAVA 422, 423. In the class definition the class includes methods for clearing the variable percentage and for setting the MPEG graphic initially to 0 percent.slc wherein slc represents an MPEG slice. In addition, the progress bar includes an Object Data Segment 417 that provides interface data (name of the progress bar), visible data (the size of the progress bar MPEG slices) and progress data (an internal variable that is updated as progress of the event being measured increases) 418. The progress bar MPEG object includes resource data 316 that includes MPEG slices that represent the various graphical states representing percentages of completion of the event being monitored. Thus, there may be ten different progress bar graphics each composed of MPEG slices 419. These MPEG slices can be combined with other MPEG slices to form a complete MPEG frame.

An authoring environment provides for the creation and manipulation of MPEG objects and allows for the creation of scenes for an interactive application. The authoring environment is preferably a graphical user interface authoring tool for creating MPEG objects and interactive applications by graphical selection of MPEG objects. The authoring environment includes two interfaces. The first interface is the authoring tool for creating MPEG objects and defining application scenes. The second interface is a script editor that allows a designer to add events and methods to MPEG object or to a scene. The output of the authoring environment may be self contained binary code for an MPEG object or a structured data file representing an application. The structured data file for an application includes information regarding the MPEG objects within a scene, the location of the MPEG graphical element of the MPEG object within a frame, properties for the MPEG object, the address/memory location of the MPEG object, and scripts for the application that access and use the MPEG objects. The self contained binary code for an MPEG object may be used by an application. The application may access an MPEG object by referencing the memory location wherein the self-contained binary code is located.

Figure 5:
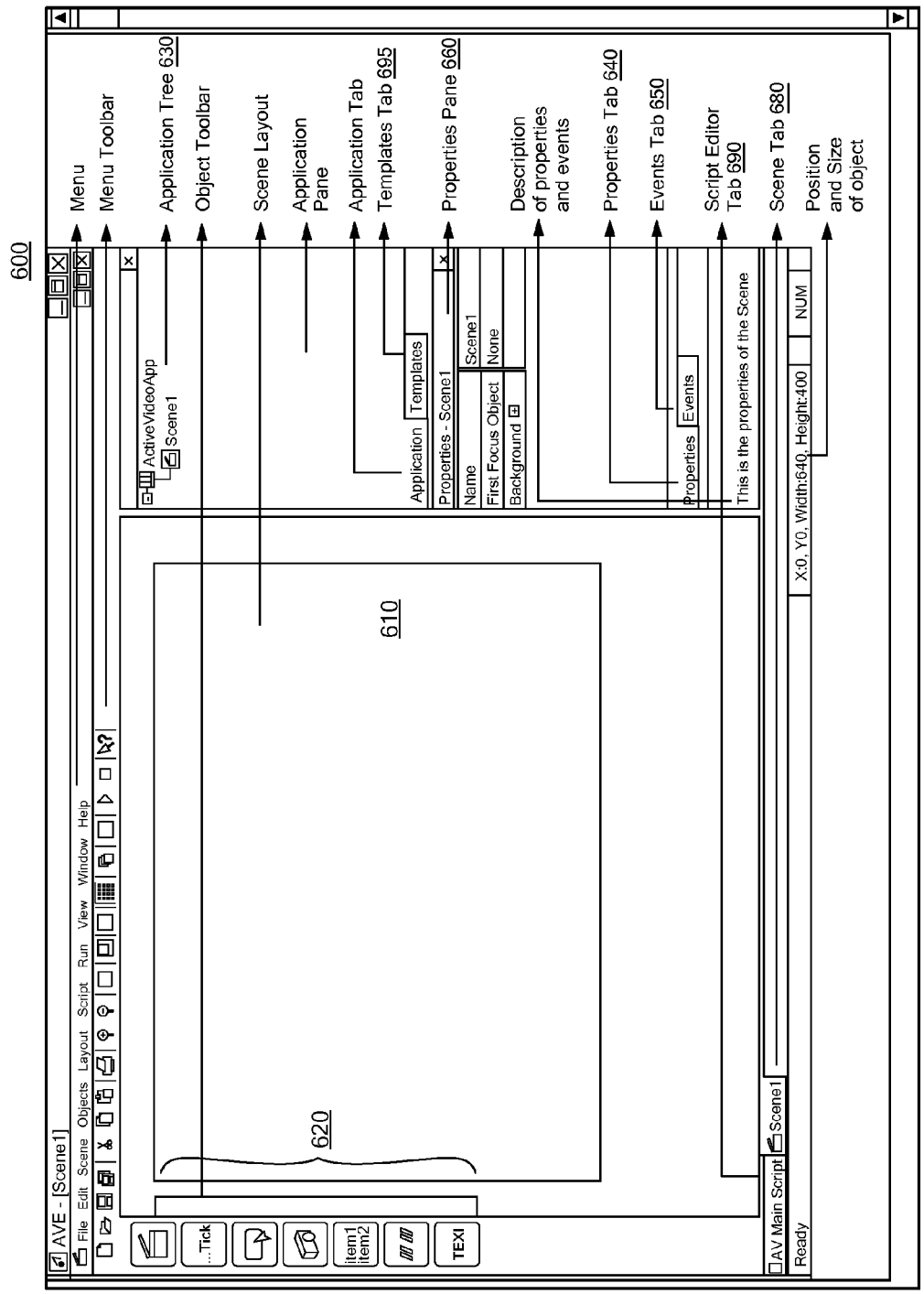
FIG. 5 shows an exemplary screen shot of an authoring environment for creating applications that use MPEG objects.

FIG. 5 graphically shows the authoring environment 600. The graphical environment allows an application designer to add MPEG objects into a scene layout 610 though graphical selection of a representative icon 620 that is linked to the underlying object code. In addition, the authoring environment allows a user to create new MPEG objects.

A top level scene will be the first scene that is provided to a user's device when the application is loaded. The application designer can select and drag and drop an object from the object toolbar 620. For example, the designer can insert user interface objects such as: a media player object, a ticker object, a button object, a static image, a list box object, or text. The authoring environment includes other objects such as container objects, session objects and timer objects that are not graphical in nature, but are part of the MPEG object model.

The authoring environment includes an application tree 630 that indicates the level of the application. For example, an application may include a plurality of video scenes wherein a single scene is equivalent to a portion of a webpage. The video scene may allow a user of the interactive video to drill down to a second scene by selecting a link within the video scene. The second scene would be at a level that is lower than the first scene. The application tree 630 provides both a listing of the scene hierarchy as well as a listing of the objects within the scene in a hierarchical order.

Rather than the creation of an application, the designer may create an object or a hierarchical object that contains a plurality of objects. Thus, the output of the authoring environment may also be that of an MPEG object. The designer would provide graphical content, for example in the form of a JPEG image, and the authoring environment would render the JPEG image and encode the JPEG image as a sequence of slices. The authoring environment would also allow the designer to define scripts, methods and properties for the object.

For example, a designer may wish to create a new media player MPEG object to display viewable media streams. The designer may import a graphic that provides a skin for the media player that surrounds the media stream. The graphic would be rendered by the authoring environment and encoded as a plurality of MPEG slices. The designer could then add in properties for the media player object such as the name and location of the media stream, whether a chaser (highlighting of the media stream within the video frame) is present, or the type of highlighting (i.e. yellow ring around the object that has focus). In addition, the designer may include properties that indicate the objects that are located in each direction in case a user decides to move focus from the media player object to another object. For example, there may be a chaser up, down, left, and right properties and associated methods that indicate the object that will receive focus if the current media player object has focus and the user uses a remote control coupled to the user's device (i.e. set-top box) and presses one of the direction keys. The MPEG object designer may provide the media player object with events such as on Load that is triggered every time a user views the scene that has the media player object. Other events may include on Focus that indicates that the object has received focus and on Blur that indicates the object has lost focus. An on KeyPress event may be included indicating that if the object is in focus and a key is pressed that this event will occur. The events and properties for the Media Player Object are provided for exemplary purposes to show the nature and scope of events and properties that can be associated with an MPEG object. Other MPEG objects can be created having similar event and properties as well as distinct events and properties as required by the application designer.

Figure 6A:
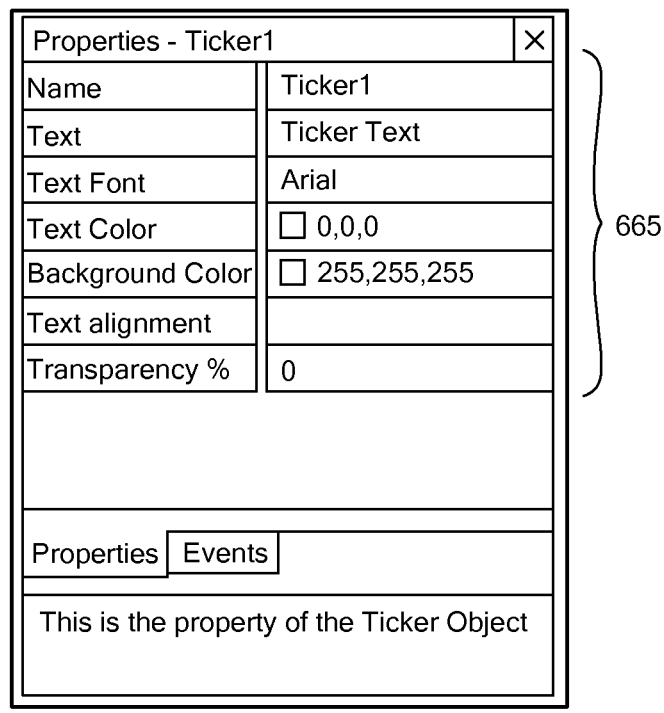
FIG. 6A shows an exemplary screen shot of a properties tab for an MPEG object.
Figure 6B:
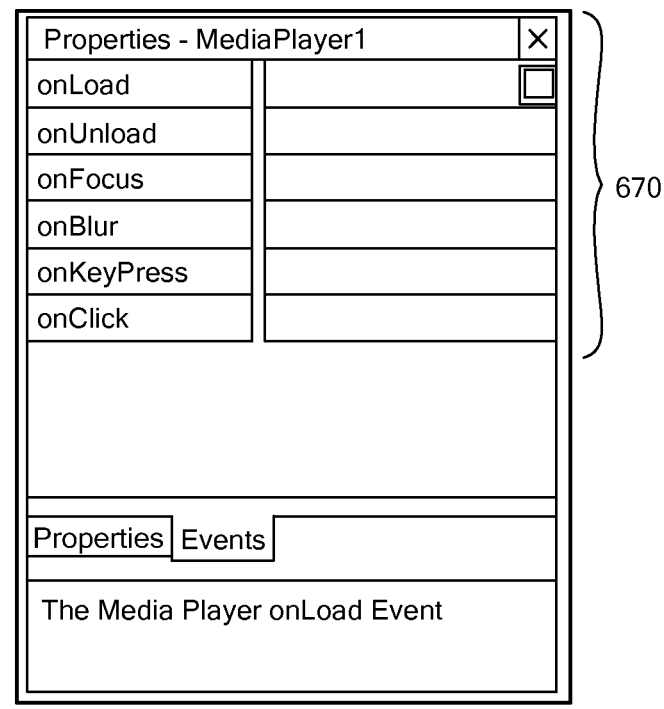
FIG. 6B shows an exemplary screen shot of an event tab for an MPEG object.

The authoring environment includes a properties 640 and event tab 650 for defining the properties of a predefined or new object. An example of the properties pane 660 is shown in FIG. 6A. The properties for a predefined ticker object (a banner that appears to scroll across the video frame) includes the background color, the text color, the text font and the transparency of the ticker 665. It should be recognized that each object type will have different properties. The events tab allows the application designer to make associations between events (received signals from the user) and the object. For example, a button object may include a plurality of states (on and off). Associated with each state may be a separate MPEG video sequence. Thus, there is a video graphic for the "on" state that indicates the button has been activated and a video graphic for the "off" state that indicates the button is inactive. The event tab allows the application designer to make the association between the signal received from the user, the state change of the object and the change in the video content that is part of the scene. FIG. 6B shows an example of the event tab when selected for a predefined media player object. The events include an on Load, on Focus, on Blur, on Key-Press, and onClick events 670 for the media player. The authoring environment allows the designer to tab between scenes 680 and tab between the scene layout and the scripting page 690. As shown, the authoring environment includes a template tab. The template tab 695 allows for selection of previously saved scenes, so that a designer can use design information from previous scenes for the creation of new scenes. In addition, the designer may be provided with blank event panes and properties panes so that the designer can create a new MPEG object defining properties and events for the new object.

Figure 6C:
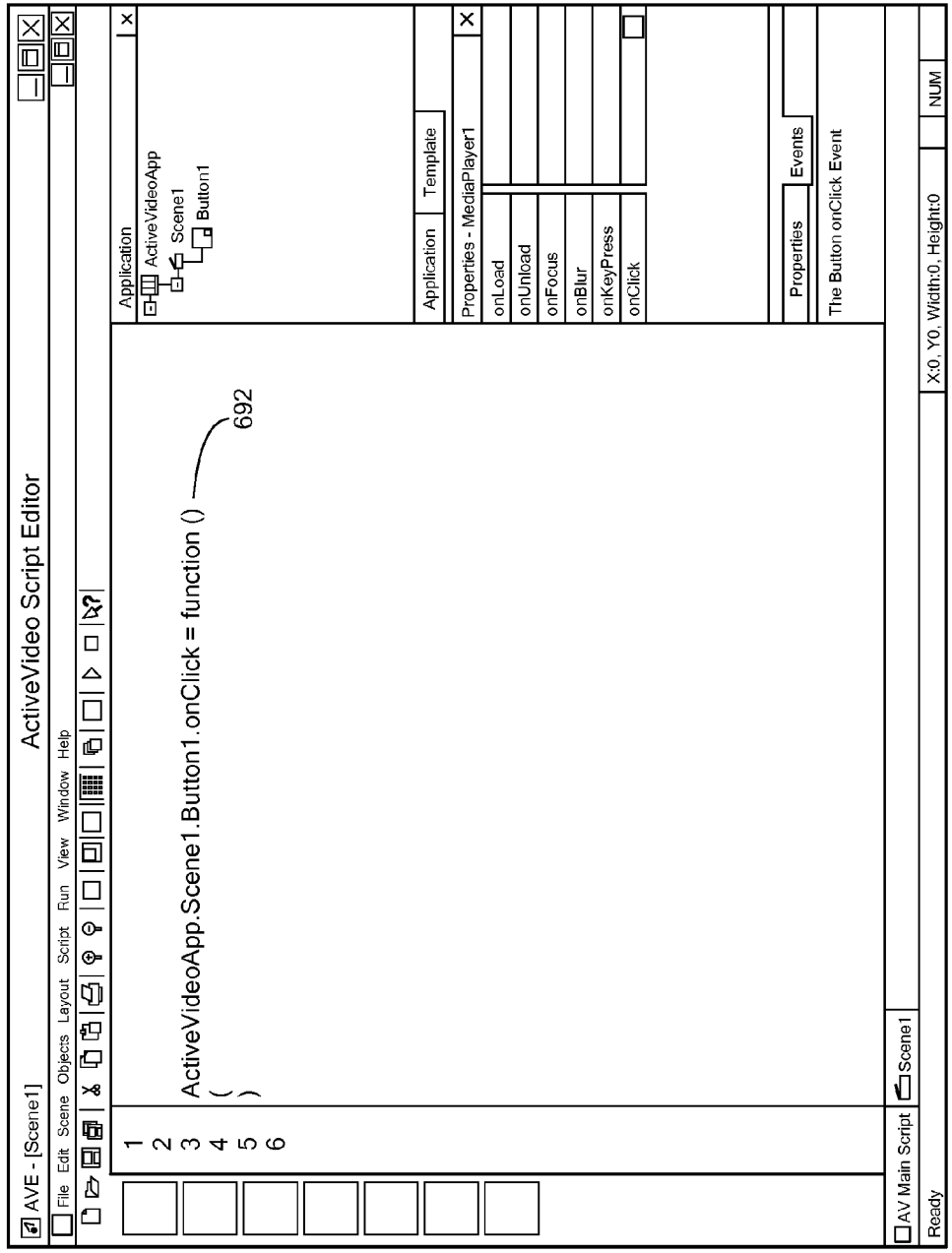
FIG. 6C shows an exemplary screen shot of a script editor that can be used to create a script for an application that uses MPEG objects.

Scripts can be added to an application or to a newly created object by selecting the scripting tab. FIG. 6C shows the script editor 691. For example, the script may determine the function that is provided if a client attempts to select a button graphic 692. In this example, the script would be part of the application file. Similarly, the designer may designate that the script is to be used for creating a script internal to the MPEG object such as the client script within the MPEG streaming object shown in FIG. 2 or the script shown in the atomic object of FIG. 1.

MPEG objects may also be generated in real-time. In this paradigm, a request for an MPEG object is made to the session processor wherein the MPEG object has undefined video and/or audio content. A script at the session processor will cause a separate processor/server to obtain and render the video content for the object, encode the content as an MPEG element and return a complete MPEG object in real-time to the session processor. The server may construct either an atomic or streaming MPEG object. The server may also employee caching techniques to store the newly defined MPEG objects for subsequent MPEG object requests. This methodology is useful for distributed rendering of user specific or real-time generated content. For example, the server may act as a proxy that transcodes a client's photo album where the photos originate in a JPEG format and the server stores the photos as MPEG elements within an MPEG photo album object. The server may then pass the MPEG photo album object to the session processor for use with the requested application. Additionally, the MPEG photo album object would be saved for later retrieval when the client again requests the photo album.

Once the designer has completed the design of the application or the MPEG object, the system takes the received information and converts the information into either binary code if a new MPEG object is created or an AVML (active video mark-up language) file if the designer has created a new application. The AVML file is XML based in syntax, but contain specific structures relevant to the formation of an interactive video. For example, the AVML file can contain scripts that interact with MPEG objects. An explanation of the AVML language can be found in Appendix A attached to U.S. patent application entitled, entitled, "Interactive Encoded Content System including Object Models for Viewing on a Remote Device" filed concurrently herewith on Jan. 11, 2008 and assigned to the same assignee, which is incorporated by reference in its entirety. All objects within an application scene have a hierarchy in a logical stack. The hierarchy is assigned based on the sequence of adding the object in the scene. The object first added to the scene is at the bottom of the stack. Objects may be moved up or down within the hierarchy prior to completion of the design and conversion of the graphical scene into the AVML file format. New MPEG objects that are in binary code may be incorporated into applications by referencing the storage location for the binary code.

The AVML file output from the authoring environment allows a stitcher module to be aware of the desired output slice configuration from the plurality of MPEG elements associated with the MPEG objects referenced within the AVML file. The AVML file indicates the size of the slices and the location of the slices within an MPEG frame. In addition, the AVML file describes the encapsulated self-describing object presentations or states of the MPEG objects. For example, if a button object is graphically placed into the authoring environment by a user, the authoring environment will determine the position of the button within an MPEG video frame based upon this dynamic placement. This position information will be translated into a frame location and will be associated with the MPEG button object. State information will also be placed within the AVML file. Thus, the AVML file will list the states for the MPEG button object (on and off) and will have a reference to the location of each MPEG graphical file (MPEG elements) for those two states.

Figure 7:
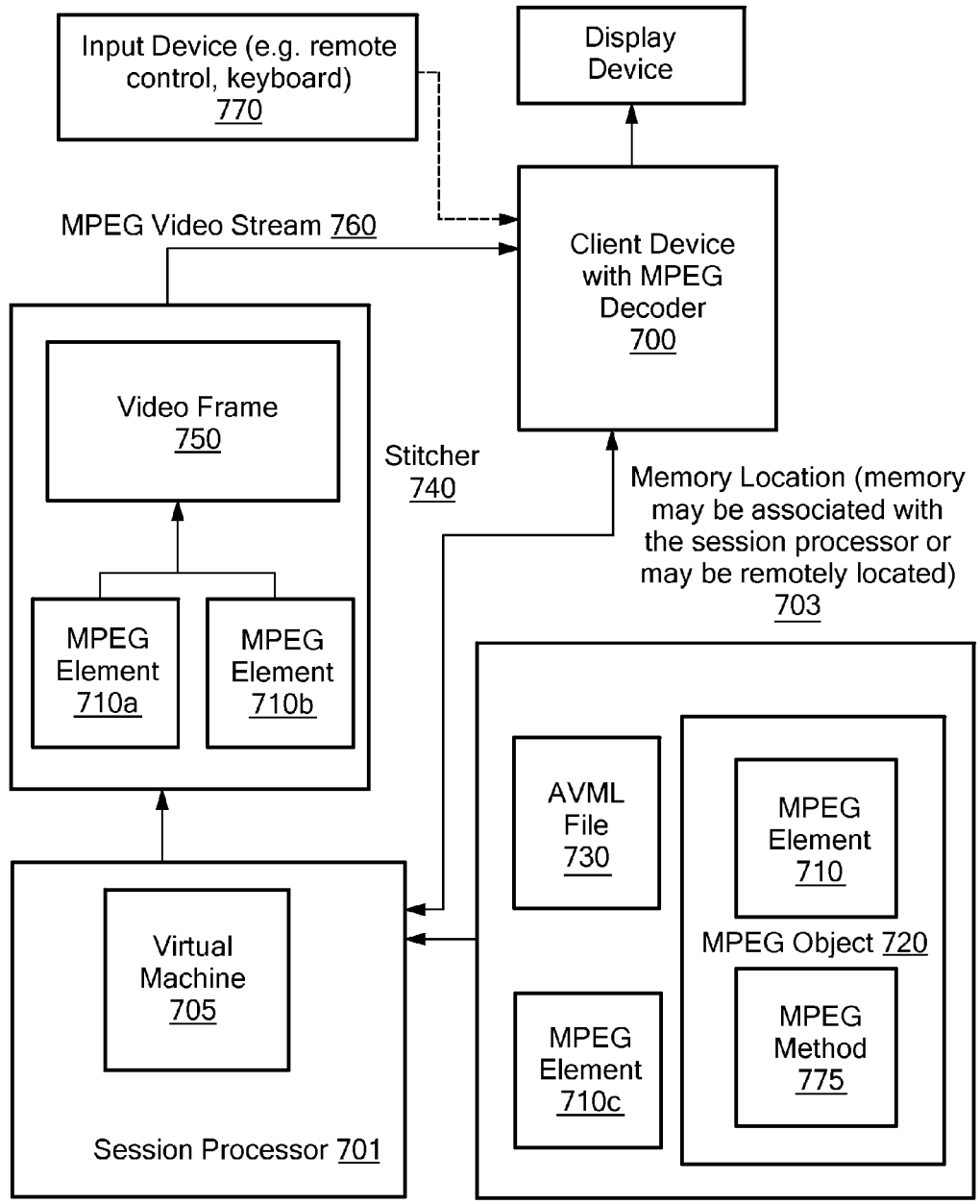
FIG. 7 shows a system for using MPEG objects for interactive content.

After an application is defined by an application designer, a client can request the application by using the client's device 700 as shown in FIG. 7. The client's device 700 will request an interactive session and a session processor 701 will be assigned. The session processor 701 will retrieve the AVML file 702 from a memory location 703 for the requested application and will run a virtual machine 705. The virtual machine 705 will parse the AVML file and identify the MPEG objects that the session processor 701 needs to access for the application. The virtual machine 705 will determine the position of each graphical element 710 from the accessed MPEG objects 720 within a video frame based upon the position information from the AVML file 730 and the sizing information as defined within the MPEG objects 720. As shown, only one MPEG object is present in the Fig. although many MPEG objects may be used in conjunction with the AVML file. Additionally, the MPEG object that is shown stored in memory has two representative components, the MPEG element 710 and the MPEG method 775. As expressed above, the MPEG element may be internal to the MPEG object or may be external. The MPEG elements 710a,b, which are preferably MPEG slices from one or more MPEG objects are then passed to the stitcher 740 by the virtual machine 705 and the stitcher sequences the slices so that they form an MPEG video frame 750 according to the position information parsed by the virtual machine. The stitcher is presented with the MPEG elements associated with the objects for each state. For example, if an MPEG button object has MPEG elements of 64×64 pixels and has two states (on and off), the stitcher will buffer the pre-encoded 64×64 pixel MPEG elements for each state.

The MPEG video frame 750 is encapsulated so that it forms a part of an MPEG video stream 760 that is then provided to the client device 700. The client device 700 can then decode the MPEG video stream. The client may then interact with MPEG objects by using an input device 770. The session processor 701 receives the signal form the input device 770 and based on the signal and the object selected methods 775 of the MPEG object 720 will be executed or interpreted by the virtual machine 705 and an MPEG video element 710a will be updated and the updated video element content 710c will be passed to the stitcher 740. Additionally, state information maintained by the session processor for the MPEG object that has been selected will be updated within the application (AVML file). The MPEG video element 710c may already be stored in a buffer within the stitcher. For example, the MPEG element 710c may be representative of a state. A request for change in state of a button may be received by the session processor and the stitcher can access the buffer that contains the MPEG slices of the MPEG element for the 'off-state' assuming the button was previously in the 'on-state.' The stitcher 740 can then replace the MPEG element slice 710a within the MPEG frame 750 and the updated MPEG frame 750a will be sent to the client device 700. Thus, the client interacts with the MPEG content even though the client device may only have an MPEG decoder and an upstream connection for sending signals/instructions to the assigned session processor 701.

Although the present invention has been described in terms of MPEG encoding, the invention may be employed with other block based encoding techniques for creating objects that are specific to those block based encoding techniques. The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

What is claimed is:

1. A tool for creating interactive MPEG content, the tool comprising:
    an editor having a scene window allowing a user to create a scene based upon placement of atomic MPEG objects within the scene window;
    an object tool bar allowing a user to add the atomic MPEG objects to the scene, each of the atomic MPEG objects having a respective plurality of visual states and comprising a respective plurality of graphical elements, each graphical element of the respective plurality of graphical elements corresponding to a respective visual state of the respective plurality of visual states, each of the atomic MPEG objects further comprising code to construct each visual state of the respective plurality of visual states, wherein:
        when a respective atomic MPEG object of the atomic MPEG objects is placed within the scene window, user-modifiable properties associated with the respective atomic MPEG object are displayed,
        the user can create a user-definable script for the respective atomic MPEG object, and
        a first atomic MPEG object of the atomic MPEG objects represents interactive graphical content; and
    a format processor comprising hardware for processing the scene into a file format that includes display position information of respective pluralities of graphical elements of the atomic MPEG objects that were added to the scene, so as to allow a stitcher to form a complete MPEG video frame from the respective pluralities of graphical elements,
    wherein different MPEG frames can be assigned to a respective visual state of the pluralities of visual states.

2. The tool according to claim 1, wherein when a respective atomic MPEG object of the atomic MPEG objects is placed within the scene window, the editor snaps a first graphical element of the plurality of graphical elements of the respective atomic MPEG object to an MPEG macroblock boundary.

3. The tool according to claim 1, wherein the respective pluralities of graphical elements of the atomic MPEG objects comprise respective pluralities of MPEG video elements corresponding to different visual states of the respective pluralities of visual states.

4. The tool according to claim 1, wherein the first atomic MPEG object represents a button.

5. The tool according to claim 1, wherein after a scene is defined, the editor creates an XML-based output file.

* * * * *